United States Patent
Park et al.

(10) Patent No.: US 12,557,103 B2
(45) Date of Patent: Feb. 17, 2026

(54) SCHEDULING RESTRICTIONS DURING A GROUP-BASED MEASUREMENT FOR MULTIPLE TRANSMISSION AND RECEPTION POINTS

(71) Applicant: QUALCOMM Incorporated, San Diego, CA (US)

(72) Inventors: Changhwan Park, San Diego, CA (US); Sumant Jayaraman Iyer, San Diego, CA (US); Mostafa Khoshnevisan, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 769 days.

(21) Appl. No.: 17/940,613

(22) Filed: Sep. 8, 2022

(65) Prior Publication Data
US 2024/0089967 A1    Mar. 14, 2024

(51) Int. Cl.
*H04W 72/20* (2023.01)

(52) U.S. Cl.
CPC .................. *H04W 72/20* (2023.01)

(58) Field of Classification Search
CPC ..................................................... H04W 72/20
See application file for complete search history.

(56) References Cited

U.S. PATENT DOCUMENTS

2020/0028609 A1*  1/2020  Ahn ...................... H04L 1/00
2020/0068462 A1*  2/2020  Zetterberg ............ H04W 16/28
2024/0056247 A1*  2/2024  Muruganathan ...... H04L 5/0051

FOREIGN PATENT DOCUMENTS

EP         4092928 B1 *  1/2025  ........... H04B 7/0617
WO  WO-2024031693 A1 *  2/2024  ........... H04W 24/10

OTHER PUBLICATIONS

3GPP TS 38.331 V17.1.0 (Jun. 2022) 3rd Generation Partnership Project; Technical Specification Group Radio Access Network; NR; Radio Resource Control (RRC) protocol specification (Release 17), pp. 556-557 (Year: 2022).*

* cited by examiner

*Primary Examiner* — Joseph A Bednash
(74) *Attorney, Agent, or Firm* — Holland & Hart LLP

(57) ABSTRACT

Methods, systems, and devices for wireless communications are described. In some aspects, a user equipment (UE) may receive an indication of a set of channel measurement resources (CMRs) that are configured for a group-based reference signal measurement for multiple transmission and reception points (TRPs). The UE may identify or determine whether a set of one or more directional beams used by the UE to measure reference signal transmissions from each of the multiple TRPs satisfy a threshold directivity gain. The UE may transmit a request to enable a scheduling restriction at the UE for a time period associated with the group-based reference signal measurement if the set of directional beams fail to satisfy the threshold directivity gain and may transmit a request to disable the scheduling restriction if the set of directional beams satisfy the threshold directivity gain.

30 Claims, 16 Drawing Sheets

SCHEDULING RESTRICTIONS DURING A GROUP-BASED MEASUREMENT FOR MULTIPLE TRANSMISSION AND RECEPTION POINTS

FIELD OF TECHNOLOGY

The following relates to wireless communications, including scheduling restrictions during a group-based measurement for multiple transmission and reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support scheduling restrictions during a group-based measurement for multiple transmission and reception points (TRPs). For example, the described techniques provide for a user equipment (UE)-led, -initiated, or -informed scheduling restriction during group-based channel measurements depending on a set of one or more directional beams that the UE uses for the group-based channel measurements. In some implementations, the UE may request a scheduling restriction for a time period associated with one or more group-based channel measurement resources (CMRs) if the one or more directional beams used by the UE fail to satisfy a threshold directivity gain. In some other implementations, the UE may request no scheduling restriction for a time period associated with any group-based CMRs if the one or more directional beams used by the UE satisfy the threshold directivity gain.

A method for wireless communication at a UE is described. The method may include receiving, from a network entity, an indication of multiple CMRs for a group-based reference signal measurement, transmitting, to the network entity in accordance with the multiple CMRs being for the group-based reference signal measurement, a request to enable or disable a scheduling restriction at the UE for a time period, the time period associated with one or more of the multiple CMRs, and receiving, from the network entity, information associated with the scheduling restriction at the UE in accordance with the request.

An apparatus for wireless communication at a UE is described. The apparatus may include a processor, memory coupled with the processor, and one or more instructions stored in the memory. The one or more instructions stored in the memory may be executable by the processor to cause the apparatus to, based on the one or more instructions, receive, from a network entity, an indication of multiple CMRs for a group-based reference signal measurement, transmit, to the network entity in accordance with the multiple CMRs being for the group-based reference signal measurement, a request to enable or disable a scheduling restriction at the UE for a time period, the time period associated with one or more of the multiple CMRs, and receive, from the network entity, information associated with the scheduling restriction at the UE in accordance with the request.

Another apparatus for wireless communication at a UE is described. The apparatus may include means for receiving, from a network entity, an indication of multiple CMRs for a group-based reference signal measurement, means for transmitting, to the network entity in accordance with the multiple CMRs being for the group-based reference signal measurement, a request to enable or disable a scheduling restriction at the UE for a time period, the time period associated with one or more of the multiple CMRs, and means for receiving, from the network entity, information associated with the scheduling restriction at the UE in accordance with the request.

A non-transitory computer-readable medium storing code for wireless communication at a UE is described. The code may include instructions executable by a processor to receive, from a network entity, an indication of multiple CMRs for a group-based reference signal measurement, transmit, to the network entity in accordance with the multiple CMRs being for the group-based reference signal measurement, a request to enable or disable a scheduling restriction at the UE for a time period, the time period associated with one or more of the multiple CMRs, and receive, from the network entity, information associated with the scheduling restriction at the UE in accordance with the request.

In some examples of the method, apparatuses, and non-transitory computer-readable medium described herein, transmitting the request to enable or disable the scheduling restriction at the UE may include operations, features, means, or instructions for transmitting an indication of whether the UE uses a different set of one or more directional receive beams for the group-based reference signal measurement than used for reception of one or more control or data channel transmissions, where a use of one or more different directional receive beams may be associated with a request to enable the scheduling restriction and a use of one or more same directional beams may be associated with a request to disable the scheduling restriction.

Some examples of the method, apparatuses, and non-transitory computer-readable medium described herein may further include operations, features, means, or instructions for measuring a first CMR of the multiple CMRs using a first directional receive beam and a second CMR of the multiple CMRs using a second directional receive beam, where the request to enable or disable the scheduling restriction at the UE may be based on a directivity gain of one or both of the first directional receive beam and the second directional receive beam.

In some examples of the method, apparatuses, and non-transitory computer-readable medium described herein, transmitting the request to enable or disable the scheduling restriction at the UE may include operations, features, means, or instructions for transmitting a request to enable the scheduling restriction at the UE based on the directivity gain of one or both of the first directional receive beam and the second directional receive beam failing to satisfy a threshold directivity gain, where the information associated with the scheduling restriction received from the network entity indicates a presence of the scheduling restriction for the time period.

In some examples of the method, apparatuses, and non-transitory computer-readable medium described herein, transmitting the request to enable the scheduling restriction at the UE may include operations, features, means, or instructions for transmitting an indication of one or more transmission parameters that may be requested to be used for any control or data channel transmissions scheduled during the time period if the directivity gain satisfies a second threshold directivity gain, where the one or more transmission parameters include a relatively higher aggregation level, a relatively lower rank, or a relatively lower coding rate, or any combination thereof, relative to an aggregation level, a rank, or a coding rate used for control or data channel transmissions based on a non-group-based reference signal measurement.

In some examples of the method, apparatuses, and non-transitory computer-readable medium described herein, transmitting the request to enable the scheduling restriction at the UE may include operations, features, means, or instructions for transmitting an indication of a requested restriction against scheduling any control or data channel transmissions during the time period if the directivity gain fails to satisfy a second threshold directivity gain.

In some examples of the method, apparatuses, and non-transitory computer-readable medium described herein, the first directional receive beam and the second directional receive beam may be associated with different sub-arrays of a same antenna array of the UE and the directivity gain failing to satisfy the threshold directivity gain may be based on the first directional receive beam and the second directional receive beam being associated with the different sub-arrays of the same antenna array of the UE.

In some examples of the method, apparatuses, and non-transitory computer-readable medium described herein, transmitting the request to enable or disable the scheduling restriction at the UE may include operations, features, means, or instructions for transmitting a request to disable the scheduling restriction at the UE based on the directivity gain of one or both of the first directional receive beam and the second directional receive beam satisfying a threshold directivity gain, where the information associated with the scheduling restriction received from the network entity indicates an absence of the scheduling restriction for the time period.

Some examples of the method, apparatuses, and non-transitory computer-readable medium described herein may further include operations, features, means, or instructions for monitoring, using the second directional receive beam, for a first set of one or more control or data channel transmissions during a first time period that at least partially overlaps with the first CMR and monitoring, using the first directional receive beam, for a second set of one or more control or data channel transmissions during a second time period that at least partially overlaps with the second CMR.

In some examples of the method, apparatuses, and non-transitory computer-readable medium described herein, the first directional receive beam and the second directional receive beam may be associated with different antenna arrays of the UE and the directivity gain satisfying the threshold directivity gain may be based on the first directional receive beam and the second directional receive beam being associated with the different antenna arrays of the UE.

In some examples of the method, apparatuses, and non-transitory computer-readable medium described herein, the group-based reference signal measurement may be associated with reference signal measurements from multiple TRPs and each TRP may be associated with a different CMR set.

A method for wireless communication at a network entity is described. The method may include outputting an indication of multiple CMRs for a group-based reference signal measurement, obtaining, in accordance with the multiple CMRs being for the group-based reference signal measurement, a request to enable or disable a scheduling restriction at a UE for a time period, the time period associated with one or more of the multiple CMRs, and outputting information associated with the scheduling restriction at the UE in accordance with the request.

An apparatus for wireless communication at a network entity is described. The apparatus may include a processor, memory coupled with the processor, and one or more instructions stored in the memory. The one or more instructions stored in the memory may be executable by the processor to cause the apparatus to, based on the one or more instructions, output an indication of multiple CMRs for a group-based reference signal measurement, obtain, in accordance with the multiple CMRs being for the group-based reference signal measurement, a request to enable or disable a scheduling restriction at a UE for a time period, the time period associated with one or more of the multiple CMRs, and output information associated with the scheduling restriction at the UE in accordance with the request.

Another apparatus for wireless communication at a network entity is described. The apparatus may include means for outputting an indication of multiple CMRs for a group-based reference signal measurement, means for obtaining, in accordance with the multiple CMRs being for the group-based reference signal measurement, a request to enable or disable a scheduling restriction at a UE for a time period, the time period associated with one or more of the multiple CMRs, and means for outputting information associated with the scheduling restriction at the UE in accordance with the request.

A non-transitory computer-readable medium storing code for wireless communication at a network entity is described. The code may include instructions executable by a processor to output an indication of multiple CMRs for a group-based reference signal measurement, obtain, in accordance with the multiple CMRs being for the group-based reference signal measurement, a request to enable or disable a scheduling restriction at a UE for a time period, the time period associated with one or more of the multiple CMRs, and output information associated with the scheduling restriction at the UE in accordance with the request.

In some examples of the method, apparatuses, and non-transitory computer-readable medium described herein, obtaining the request to enable or disable the scheduling restriction at the UE may include operations, features, means, or instructions for obtaining an indication of whether the UE uses a different set of one or more directional receive beams for the group-based reference signal measurement than used for reception of one or more control or data channel transmissions, where a use of one or more different directional receive beams may be associated with a request to enable the scheduling restriction and a use of one or more same directional beams may be associated with a request to disable the scheduling restriction.

In some examples of the method, apparatuses, and non-transitory computer-readable medium described herein, obtaining the request to enable or disable the scheduling restriction at the UE may include operations, features, means, or instructions for obtaining an indication of a first directional receive beam of the UE used to measure a first CMR of the multiple CMRs and a second directional receive beam of the UE used to measure a second CMR of the multiple CMRs, where the request to enable or disable the scheduling restriction at the UE may be based on a directivity gain of one or both of the first directional receive beam and the second directional receive beam.

In some examples of the method, apparatuses, and non-transitory computer-readable medium described herein, obtaining the request to enable or disable the scheduling restriction at the UE may include operations, features, means, or instructions for obtaining a request to enable the scheduling restriction at the UE based on the directivity gain of one or both of the first directional receive beam and the second directional receive beam failing to satisfy a threshold directivity gain, where the information associated with the scheduling restriction output from the network entity indicates a presence of the scheduling restriction for the time period.

In some examples of the method, apparatuses, and non-transitory computer-readable medium described herein, obtaining the request to enable the scheduling restriction at the UE may include operations, features, means, or instructions for obtaining an indication of one or more transmission parameters that may be requested to be used for any control or data channel transmissions scheduled during the time period if the directivity gain satisfies a second threshold directivity gain, where the one or more transmission parameters include a relatively higher aggregation level, a relatively lower rank, or a relatively lower coding rate, or any combination thereof, relative to an aggregation level, a rank, or a coding rate used for control or data channel transmissions based on a non-group-based reference signal measurement.

In some examples of the method, apparatuses, and non-transitory computer-readable medium described herein, obtaining the request to enable the scheduling restriction at the UE may include operations, features, means, or instructions for obtaining an indication of a requested restriction against scheduling any control or data channel transmissions during the time period if the directivity gain fails to satisfy a second threshold directivity gain.

In some examples of the method, apparatuses, and non-transitory computer-readable medium described herein, the request indicates that the first directional receive beam and the second directional receive beam may be associated with different sub-arrays of a same antenna array of the UE and the directivity gain failing to satisfy the threshold directivity gain may be based on the first directional receive beam and the second directional receive beam being associated with the different sub-arrays of the same antenna array of the UE.

In some examples of the method, apparatuses, and non-transitory computer-readable medium described herein, obtaining the request to enable or disable the scheduling restriction at the UE may include operations, features, means, or instructions for obtaining a request to disable the scheduling restriction at the UE based on the directivity gain of one or both of the first directional receive beam and the second directional receive beam satisfying a threshold directivity gain, where the information associated with the scheduling restriction output from the network entity indicates an absence of the scheduling restriction for the time period.

In some examples of the method, apparatuses, and non-transitory computer-readable medium described herein, scheduling, for a first TRP, a first set of one or more control or data channel transmissions during a first time period that at least partially overlaps with the first CMR and scheduling, for a second TRP, a second set of one or more control or data channel transmissions during a second time period that at least partially overlaps with the second CMR.

In some examples of the method, apparatuses, and non-transitory computer-readable medium described herein, the request indicates that the first directional receive beam and the second directional receive beam may be associated with different antenna arrays of the UE and the directivity gain satisfying the threshold directivity gain may be based on the first directional receive beam and the second directional receive beam being associated with the different antenna arrays of the UE.

In some examples of the method, apparatuses, and non-transitory computer-readable medium described herein, the group-based reference signal measurement may be associated with reference signal measurements from multiple TRPs and each TRP may be associated with a different CMR set.

DETAILED DESCRIPTION

Figure 1:
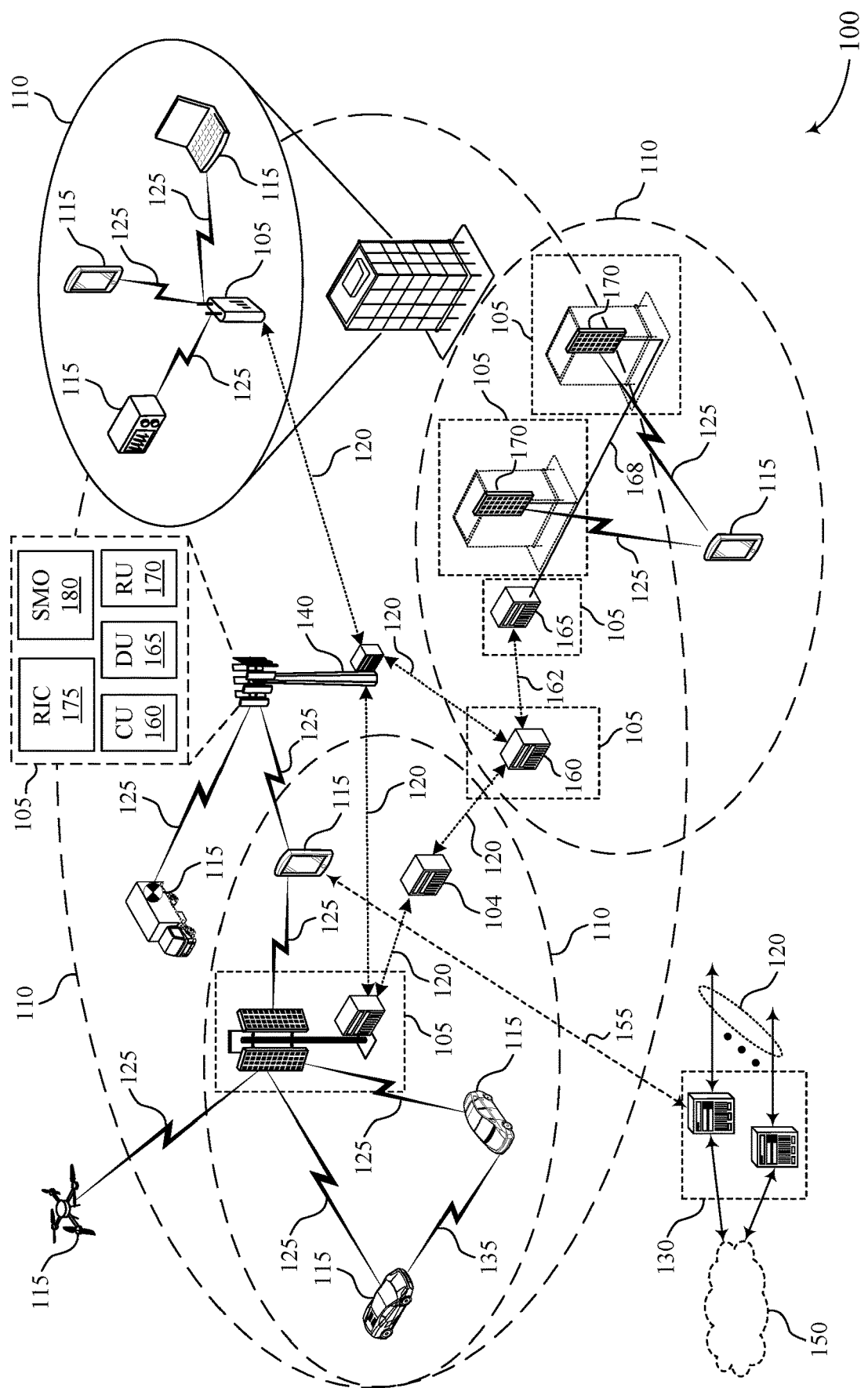
FIG. 1 shows an example of a wireless communications system that supports scheduling restrictions during a group-based measurement for multiple transmission and reception points (TRPs) in accordance with one or more aspects of the present disclosure.

In some wireless communications systems, a use equipment (UE) may operate one or more phased arrays (e.g., antenna arrays or antenna panels) and may use the one or more phased arrays to decrease a coupling loss between a transmission and reception point (TRP) and the UE. In scenarios in which the UE has multiple phased arrays, the UE may select a specific phase array to use for communication with a specific TRP based on a direction of strongest reception of downlink signaling. In some multi-TRP deployments scenarios, the strongest reception directions from two TRPs may be close enough to each other such that the UE uses a same phased array for communication with both TRPs. In such scenarios, the UE may split a single phased array into two or more sub-arrays, which the UE may use to independently track TRP-specific reference signals.

As such, during a multi-TRP beam management procedure (which may include group-based channel measurement and reporting), the UE may use reference signal measurements from each sub-array to select or refine sub-array beams for each of the two sub-arrays. Such use of sub-array beams may be associated with losses in directivity gain, as the UE may use relatively fewer antenna elements to form each sub-array beam than the UE may otherwise use for a "full-array" beam. In some network deployments, however, one or more network entities may still expect the UE to operate assuming a "full-array" directivity gain, as the network entities may be unaware of whether the UE uses different phased arrays or a same, split phased array when tracking TRP-specific reference signals. The network entities may schedule the UE in accordance with such an expectation, which may result in increased communication failures and added latency in scenarios in which the UE is using sub-arrays to track TRP-specific reference signals.

In some implementations, a UE and one or more network entities (e.g., one or more TRPs or a network entity controlling one or more TRPs, or any combination thereof) may support a signaling-based mechanism according to which the UE and the one or more network entities may conditionally employ a scheduling restriction during a multi-TRP beam management procedure depending on the directional beams used by the UE for the multi-TRP beam management procedure. For example, the UE may transmit a request to a network entity to either enable or disable a scheduling restriction for at least some time period associated with the multi-TRP beam management procedure depending on which directional beams the UE uses for the multi-TRP beam management procedure. In some implementations, the UE may request to enable or disable the scheduling restriction depending on whether the UE uses a same set of one or more directional beams that the UE may otherwise use for control or data channel transmissions, whether one or more directivity gains associated with the directional beams used by the UE satisfy one or more directivity gain thresholds, or whether the directional beams used by the UE are associated with a same phased array or different phased arrays, or any combination thereof. As described herein, a "set" may refer to a set of one or a set of multiple.

Particular implementations of the subject matter described herein can be implemented to realize one or more of the following potential advantages. For example, in accordance with using a signaling-based mechanism to conditionally employ, enable, trigger, or activate a scheduling restriction between the UE and one or more network entities (e.g., one or more TRPs) during a multi-TRP beam management procedure, the UE and the network entities may avoid control or data channel transmissions when such transmissions are relatively less likely to be successfully received by the UE and may schedule control or data channel transmissions when such transmissions are relatively more likely to be successfully received by the UE. As such, the UE and the network entities may experience a greater likelihood of successful communication. As a result of such a greater likelihood of successful communication, the UE and the network entities may achieve higher data rates, greater capacity, and greater spectral efficiency, among other benefits.

Aspects of the disclosure are initially described in the context of wireless communications systems. Aspects of the disclosure are additionally illustrated by and described with reference to a multi-TRP deployment, a beam management procedure, a communication timeline, and a process flow. Aspects of the disclosure are further illustrated by and described with reference to apparatus diagrams, system diagrams, and flowcharts that relate to scheduling restrictions during a group-based measurement for multiple TRPs.

FIG. 1 shows an example of a wireless communications system 100 that supports scheduling restrictions during a group-based measurement for multiple TRPs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support scheduling restrictions during a group-based measurement for multiple TRPs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Generally, when a UE 115 is asked (e.g., via signaling from a network entity 105) to perform a group-based beam report (e.g., a group-based reference signal measurement, which may be used in a multi-TRP deployment case), the UE 115 may try to use the same receive beam to receive reference signals from two TRPs. In some aspects, this may impose some limitation on which beam the UE 115 may use. For example, if the UE 115 is not asked to perform a group-based beam measurement, the UE may (or may not) use a different beam, which may have a different receive gain (e.g., a different directivity gain). Thus, in some implementations, there may be some scheduling restriction of physical downlink control channel (PDCCH) or physical downlink shared channel (PDSCH) when the UE 115 is asked to perform a group-based beam report measurement. For example, the UE 115 may transmit an indication to a network entity 105 to inform the network entity 105 that the UE 115 uses a different receive beam for PDSCH when asked to perform a group-based beam measurement at the same time. The network entity 105 may use or interpret such an indication as a request to enable a scheduling restriction and may employ a scheduling restriction (e.g., a partial or complete restriction) accordingly.

As such, in some implementations, a UE 115 and one or more network entities 105 (e.g., one or more TRPs or a network entity 105 controlling one or more TRPs, or any combination thereof) may support a signaling-based mechanism according to which the UE 115 and the one or more network entities 105 may conditionally employ a scheduling restriction during a multi-TRP beam management procedure depending on the directional beams used by the UE for a multi-TRP beam management procedure. Such a multi-TRP beam management procedure may include or be an example of group-based channel measurement and reporting. Group-based channel measurement may include group-based reference signal receive power (RSRP) measurements of CSI-RSs transmitted by multiple network entities 105 (e.g., multiple TRPs) in a, for example, TDM manner.

In some examples, the UE 115 may transmit a request to a network entity 105 to either enable or disable (or at least request enabling or disabling of) a scheduling restriction for at least some time period associated with a multi-TRP beam management procedure depending on which directional beams the UE 115 uses for the multi-TRP beam management procedure. In some implementations, the UE 115 may request to enable or disable the scheduling restriction depending on whether the UE 115 uses a same set of one or more directional beams that the UE 115 may otherwise use for control and data channel transmissions, whether one or more directivity gains associated with the directional beams used by the UE 115 satisfy one or more directivity gain thresholds, or whether the directional beams used by the UE 115 are associated with a same phased array or different phased arrays, or any combination thereof.

Figure 2:
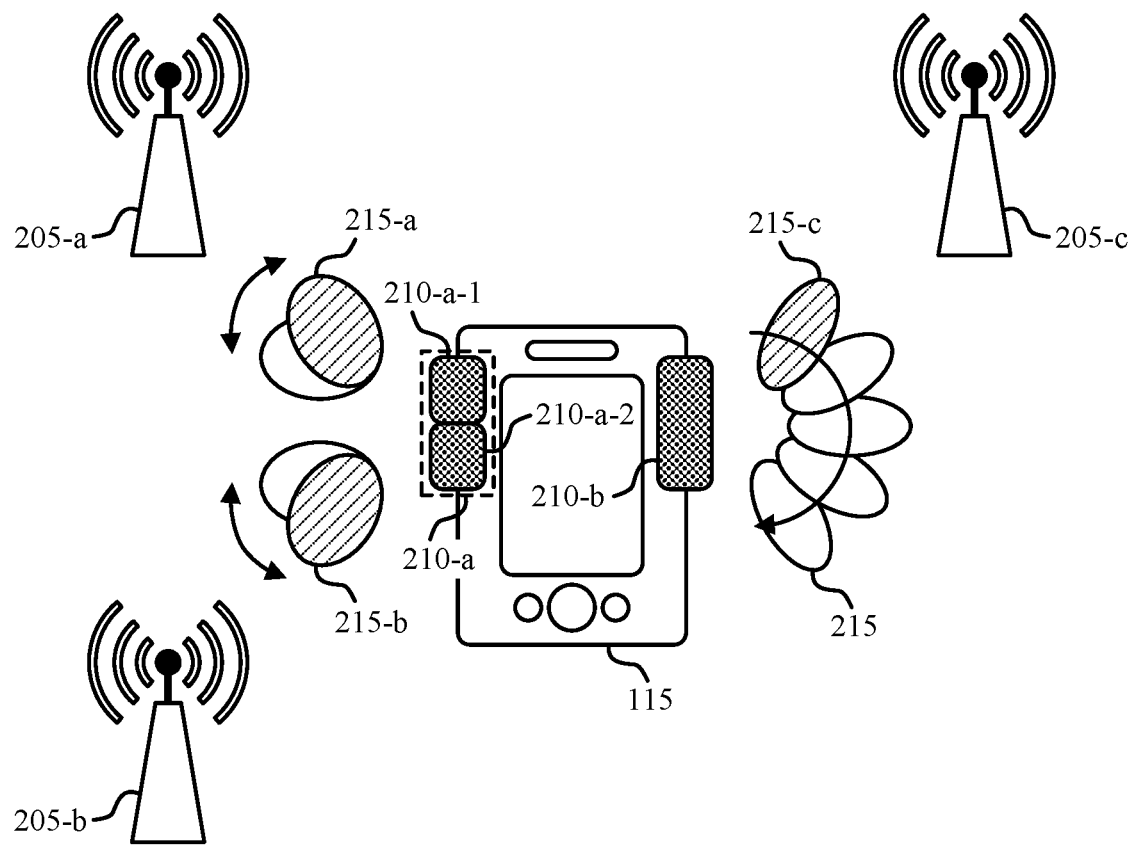
FIG. 2 shows an example of a multi-TRP deployment that supports scheduling restrictions during a group-based measurement for multiple TRPs in accordance with one or more aspects of the present disclosure.

FIG. 2 shows an example of a multi-TRP deployment 200 that supports scheduling restrictions during a group-based measurement for multiple TRPs in accordance with one or more aspects of the present disclosure. The multi-TRP deployment 200 may implement or be implemented to realize or facilitate aspects of the wireless communications system 100. For example, the multi-TRP deployment 200 illustrates communication between a UE 115, a TRP 205-a, a TRP 205-b, and a TRP 205-c, each of which may be examples of corresponding devices as illustrated and described herein, including with reference to FIG. 1. In some implementations, the UE 115 may request an enablement or disablement of a scheduling restriction during a multi-TRP beam management procedure in accordance with which one or more directional beams 215 the UE 115 uses for the multi-TRP beam management procedure.

In some deployments, the UE 115 may use one or more phased array modules 210 for reception to decrease coupling loss between a TRP 205 (which may generally refer to any one or more of the TRP 205-a, the TRP 205-b, or the TRP 205-c) and the UE 115. If the UE 115 has multiple phased array modules 210, the UE 115 may select a "best" phased array module 210 depending on a direction of strongest reception of a downlink signal. For example, the UE 115 may operate a phased array module 210-a and a phased array module 210-b and may select to use one of them for communication with a TRP 205 depending on from which phased array module 210 the UE 115 measures a greatest signal strength or quality. In an example, the UE 115 may use the phased array module 210-a for communication to one or both of the TRP 205-a and the TRP 205-c=b and may use the phased array module 210-b for communication to the TRP 205-c.

In scenarios in which the UE 115 receives (e.g., is configured or scheduled to receive) from multiple TRPs 205 (as opposed to a single-TRP case, where a single phased array module 210 may be used), the UE 115 may use one or multiple phased array modules 210. The quantity of phased array modules 210 that the UE 115 uses may depend on whether a multi-TRP case with wide separation between the multiple TRPs 205 or a multi-TRP case with narrow separation between the multiple TRPs 205 is present. In a multi-TRP case with wide separation between the multiple TRPs 205, the UE 115 may use different phased array modules 210 to communicate with each of the multiple TRPs 205. In a multi-TRP case with narrow separation between the multiple TRPs 205, the UE 115 may use a single, same phased array module 210 to communicate with each of the multiple TRPs 205.

For example, in a multi-TRP case with narrow separation between the multiple TRPs 205, the receive directions associated with each of the multiple TRPs 205 may be close enough to each other (e.g., as a result of the multiple TRPs 205 being relatively near each other) such that the UE 115 elects to use a same phased array module 210 for communication to each of the multiple TRPs 205. In such cases, the UE 115 may split a phased array module 210 into multiple sub-arrays, which the UE 115 may use independently to track one or more TRP-specific reference signals. For example, in cases in which the UE 115 is configured or scheduled to receive from (or transmit to) the TRP 205-a and the TRP 205-b, the UE 115 may use the phased array module 210-a for communication with both the TRP 205-a and the TRP 205-b. As such, the UE 115 may split the phased array module 210-a into a sub-array module 210-a-1 and a sub-array module 210-a-2. The UE 115 may use the sub-array module 210-a-1 to track TRP-specific reference signals transmitted from the TRP 205-a and may use the sub-array module 210-a-2 to track TRP-specific reference signals transmitted from the TRP 205-b. In other words, a sub-array split may enable concurrent beams directed at different TRPs 205.

To facilitate independent tracking, the UE 115 may identify, select, or otherwise determine which sub-array beams can co-exist at the UE 115 (e.g., which beams the UE 115 can use from the sub-array module 210-a-1 and the sub-array module 210-a-2 concurrently (e.g., simultaneously). In some aspects, the UE 115 may continuously refine or update such concurrently formable beams based on one or more metrics of one or more reference signals received from each TRP 205. For example, the UE 115 may continuously refine or update such concurrently formable beams based on one or more of an RSRP measurement, a channel quality indicator (CQI) measurement, a CSI measurement, or a signal-to-noise ratio (SNR) measurement, or any combination thereof, of one or more reference signals transmitted from each of the TRP 205-a and the TRP 205-b.

In some aspects, the UE 115 may use each sub-array (e.g., each half-array) to make, perform, or otherwise obtain measurements on a reference signal designated for that sub-array. For example, the UE 115 may use the sub-array module 210-a-1 to measure a designated reference signal transmitted from the TRP 205-a and may use the sub-array module 210-a-2 to measure a designated reference signal transmitted from the TRP 205-b. Using such reference signal-based measurements, the UE 115 may measure, select, identify, or otherwise determine which directional beams 215 to use at each sub-array. In some implementations, and as illustrated by FIG. 2, the UE 115 may select to use a directional beam 215-a from the sub-array module 210-a-1 for communication with the TRP 205-a and may select to use a directional beam 215-b from the sub-array module 210-a-2 for communication with the TRP 205-b. Additionally, or alternatively, the UE 115 may select to use a directional beam 215-c from the phased array module 210-b for communication with the TRP 205-c. The UE 115 and one or more of the TRPs 205 may perform or facilitate (e.g., via reference signal transmissions) such a multi-TRP beam management procedure, which may be referred to as or include a group-based RSRP measurement, upon link establishment and periodically or aperiodically thereafter. Additional details relating to such a multi-TRP beam management procedure are illustrated by and described with reference to FIG. 3.

In some cases, sub-array beams (e.g., directional beams 215 formed from a sub-array) may have relatively lower directivity gains as compared to full-array beams (e.g., directional beams 215 formed from a non-split phased array). In some aspects, such a loss in directivity gain for sub-array beams relative to full-array beams may be associated with a quantity of antenna elements that the UE 115 may use to form a given directional beam 215. For example, as a result of splitting the phased array module 210-a into the sub-array module 210-a-1 and the sub-array module 210-a-2, the UE 115 may use fewer antenna elements to form directional beams 215 from each of the sub-array module 210-a-1 and the sub-array module 210-a-2 as compared to a quantity of antenna elements that the UE 115 may use to form a directional beam 215 from the phased array module 210-b (e.g., a non-split phased array), at least for scenarios in which a quantity of antenna elements on each phased array module 210 of the UE 115 is approximately the same.

In some network deployments, one or more network entities 105 or TRPs 205 may be unaware of whether a UE 115 uses one or more split phased arrays or one or more non-split (e.g., full) phased arrays during a multi-TRP beam management procedure. As such, a network entity 105 (e.g., a base station 140 controlling or functioning as one or more TRPs 205) may schedule control or data channel transmissions to a UE 115 during a multi-TRP beam management procedure in accordance with an expectation that the UE 115 uses full-array beams. Accordingly, in cases in which the UE 115 uses sub-array beams during a multi-TRP beam management procedure, the UE 115 may be relatively less likely to successfully receive control or data channel transmissions during the multi-TRP beam management procedure, which may lead to an increase in communication failures and added latency at the UE 115.

Further, some network deployments may employ rigid scheduling restrictions at a UE 115 in scenarios in which the UE 115 is simultaneously configured or scheduled for reference signal measurements using a different transmission configuration indicator (TCI) state. In other words, if the UE 115 is configured or scheduled to receive reference signals from a first TRP 205 associated with a first TCI state, a second TRP 205 associated with a second TCI state may be restricted from transmitting to the UE 115 when the UE 115 is receiving the reference signals from the first TRP 205. Such a rigid scheduling restriction, however, may be unnecessary in cases in which a UE 115 uses separate phased array modules 210 to receive from multiple TRPs 205 (as the UE 115 may still achieve a sufficient directivity gain toward multiple TRPs 205).

Accordingly, in some implementations, the UE 115 and one or more network entities 105 (e.g., one or more TRPs 205 or a network device controlling one or more TRPs 205, or any combination thereof), may employ a signaling-based mechanism according to which the UE 115 may request to enable or disable a scheduling restriction at the UE 115 for a time period associated with a multi-TRP beam management procedure. As such, the UE 115 may request to enable the scheduling restriction at the UE 115 if the UE 115 measures, ascertains, or otherwise determines that one or more directivity gains of the directional beams 215 used by the UE 115 fail to satisfy one or more threshold directivity gains, and may request to disable the scheduling restriction at the UE 115 otherwise. In some implementations, the UE 115 may request to enable the scheduling restriction in scenarios in which the UE 115 uses directional beams 215 from a same phased array module 210 and may request to disable the scheduling restriction in scenarios in which the UE 115 uses directional beams 215 from different phased array modules 210.

The request to enable or disable the scheduling restriction at the UE 115 for the time period associated with the multi-TRP beam management procedure may be an explicit request or an implicit request. In some implementations, for example, the UE 115 may transmit an indication of which directional beams 215 or which phased array modules 210, or both, the UE 115 uses during the multi-TRP beam management procedure. In such implementations, the network entity 105 that receives the indication may implicitly determine whether to enable or disable the scheduling restriction based on, for example, whether the reported directional beams 215 are a same set of directional beams 215 that the UE 115 may use (e.g., has used previously or is expected to use) for control or data channel transmissions. Additionally, or alternatively, the UE 115 may transmit an indication of a quantity of antenna elements the UE 115 is able to use for each of one or more of the directional beams 215 the UE 115 uses for the multi-TRP beam management procedure, or may indicate a directivity gain associated with each of one or more of the directional beams 215 the UE 115 uses for the multi-TRP beam management procedure, or both. Additionally, or alternatively, the UE 115 may indicate an explicit indication of whether the UE 115 expects a scheduling restriction to be enabled or disabled.

As such, the UE 115 may dynamically protect UE performance degradation to the reception of control or data channel transmissions from the TRP 205 that the UE 115 measures a group-based RSRP from in some scenarios and may dynamically allow the UE 115 to receive control or data channel transmissions from one TRP 205 while the UE 115 is performing a group-based RSRP measurement from another TRP 205 in some other scenarios. Such dynamic and signaling-based protection against performance degradation when the UE 115 is using directional beams 215 for a multi-TRP beam management procedure that have relatively poor directivity gains and allowance for multi-TRP reception during a multi-TRP beam management procedure when the UE 115 is using directional beams 215 that have relatively strong directivity gains may further improve communication efficiency at the UE 115 and across the network, which may lead to greater spectral efficiency, higher data rates, and greater capacity.

Further, although illustrated and described as phased array modules 210, a phased array module 210 may be equivalently understood or referred to as, or may be an example of, any one or more of an antenna panel, an antenna array, or one or more sets of antenna elements. The phased array modules 210 may be physical or logical, or may include or be associated with one or both of physical or logical aspects (e.g., physical antenna elements and logical antenna ports). As described herein, including with reference to FIG. 1, the UE 115 may control, orient, or focus transmission or reception, or both, in one or more of various directions in accordance with controlling aspects or components of a phased array module 210. As used herein, a "directional beam" may refer to a specific configuration of a phased array module 210 or of antenna elements of a phased array module 210 that focuses transmission or reception in a specific direction. As such, a specific directional beam may be equivalently referred to or understood as a specific configuration for directional communication. Further, a control channel transmission may generally refer to a physical control channel transmission, such as a PDCCH transmission. A data channel transmission may generally refer to a physical data channel transmission, such as a PDSCH transmission.

Figure 3:
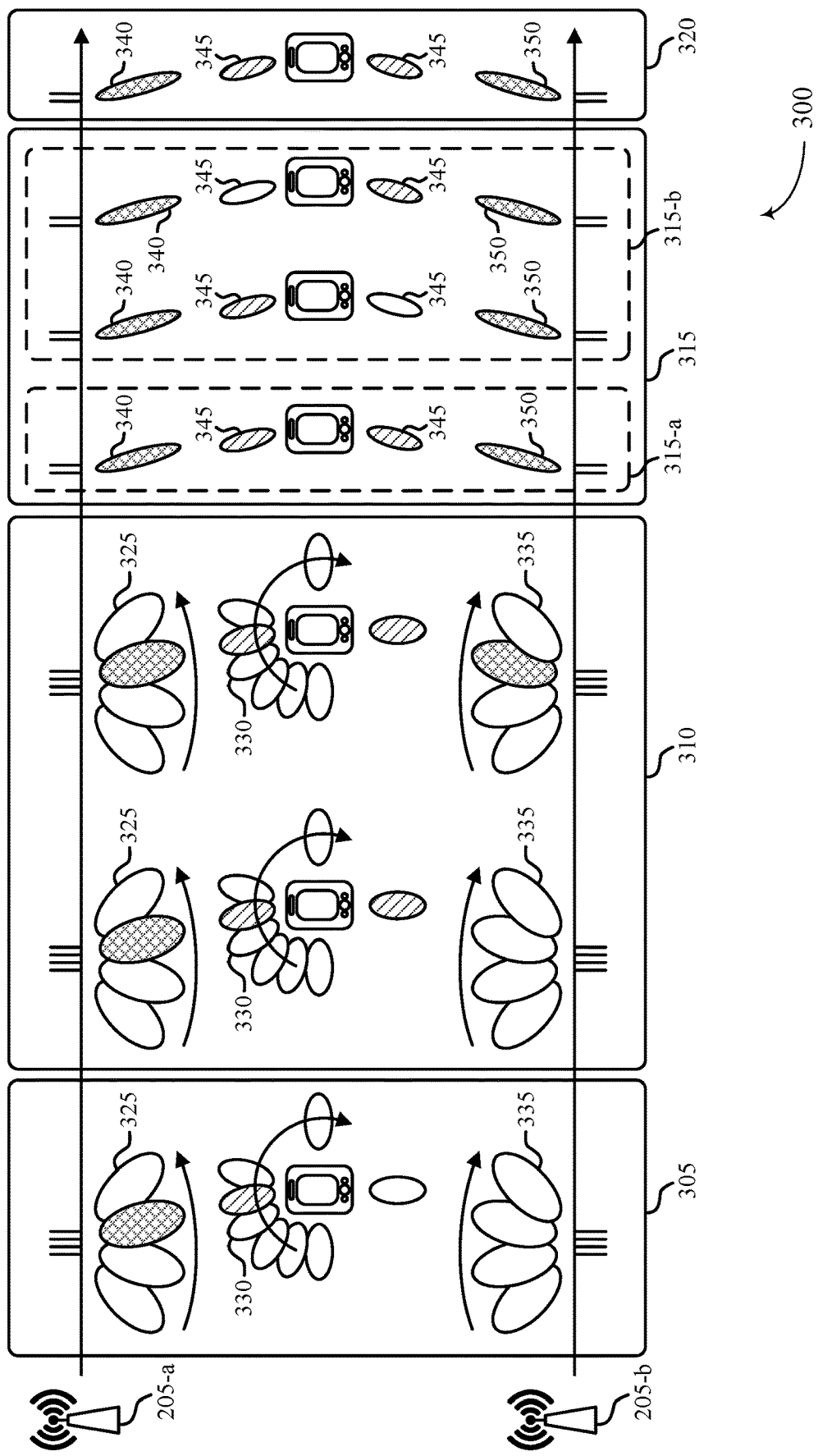
FIG. 3 shows an example of a multi-TRP beam management procedure that supports scheduling restrictions during a group-based measurement for multiple TRPs in accordance with one or more aspects of the present disclosure.

FIG. 3 shows an example of a multi-TRP beam management procedure 300 that supports scheduling restrictions during a group-based measurement for multiple TRPs in accordance with one or more aspects of the present disclosure. The multi-TRP beam management procedure 300 may implement or be implemented to realize or facilitate aspects of the wireless communications system 100 or the multi-TRP deployment 200. For example, a UE 115, a TRP 205-*a*, and a TRP 205-*b* may perform the multi-TRP beam management procedure 300 to establish or refine directional communications, and each of the UE 115, the TRP 205-*a*, and the TRP 205-*b* may be examples of corresponding devices as described herein, including with reference to FIGS. 1 and 2.

The multi-TRP beam management procedure 300 may be an example of an overall procedure for multi-TRP-based downlink reception. The TRP 205-*a* may be associated with a cell ID-A and a TRP ID-1 and may be an example of or otherwise function or operate as an anchor TRP. The TRP 205-*b* may be associated with a cell ID-A and a TRP ID-2. The multi-TRP beam management procedure 300 may include or be associated with a series of steps, including a step 305 (e.g., a step 0), a step 310 (e.g., a step 1), a step 315 (e.g., a step 2), and a step 320 (e.g., a step 3), according to which the UE 115 may establish a communication link and a corresponding directional beam oriented to each of the TRP 205-*a* and the TRP 205-*b*. The UE 115, the TRP 205-*a*, and the TRP 205-*b* may perform the multi-TRP beam management procedure 300 upon (e.g., as part of) a link establishment, periodically, or aperiodically, or any combination thereof.

At step 305, which may include beam training for the anchor TRP (e.g., only the anchor TRP, which may be the TRP 205-*a* in the example of the multi-TRP beam management procedure 300) the UE 115 may obtain a system-wise pair of refined beams. The system-wise pair of refined beams may include a transmit beam 325 used by the TRP 205-*a* (e.g., a gNB transmit beam) and a receive beam 330 used by the UE 115. As part of the beam training for the TRP 205-*a* (e.g., the anchor TRP), the TRP 205-*a* may sweep over a set of transmit beams 325 and the UE 115 may sweep over a set of receive beams 330. The TRP 205-*a* may transmit a reference signal (e.g., a CSI-RS) via each of the set of transmit beams 325. The UE 115 may perform a signal strength or quality measurement, such as an RSRP or SNR measurement, for each of the set of receive beams 330.

At step 310, which may include a group-based RSRP (e.g., a group-based L1 RSRP) measurement and report from the two TRPs 205, the UE 115 may measure an RSRP (e.g., an L1 RSRP) from the TRP 205-*a* and the TRP 205-*b*. For example, the UE 115 may be configured with multiple CSI measurement or report sets for L1-RSRP and, for each CSI report, the UE 115 may use a group-based report. As illustrated by step 310, the UE 115 may sweep across a set of receive beams 330 to measure a first set of RSRP values provided by a set of transmit beams 325 used by the TRP 205-*a* and to measure a second set of RSRP values provided by a set of transmit beams 335 used by the TRP 205-*b*.

In some scenarios, such as in scenarios in which the TRP 205-*a* and the TRP 205-*b* are relatively near each other, the UE 115 may split a phased array module 210 and use sub-array beams (e.g., directional beams from a same phased array module 210) for the L1-RSRP measurements from the two TRPs 205. In such scenarios, the UE 115 may use receive beams 330 that can co-exist (e.g., that can co-exist from a same phased array module 210). In some other scenarios, the UE 115 may use different phased array modules 210 to obtain L1-RSRP measurements from the two TRPs 205. In some aspects, the L1-RSRP measurement resources from the TRP 205-*a* and the TRP 205-*b* may be time division multiplexed.

The UE 115 may support one or more report techniques associated with the RSRP measurements obtained via the beam sweeping of step 310. In some examples, the UE 115 may transmit separate reports via which the UE 115 may report multiple pairs of L1-RSRP measurements from the two TRPs 205 as configured. In some other examples, the UE 115 may transmit a single report via which the UE 115 may report one pair of L1-RSRP measurements from the two TRPs 205. In such examples, the selection among a quantity of N pairs may be up to an implementation decision at the UE 115. In some aspects, the network (e.g., one or both of the TRP 205-*a* and the TRP 205-*b*) may still not know which pair of beams maximizes (relative to other beam pairs) capacity or throughput between the UE 115 and one or both of the TRP 205-*a* and the TRP 205-*b*.

In some examples, a group-based report may be enhanced to support multi-TRP simultaneous transmission in accordance with various techniques. A first technique may be that the UE 115 can be configured with M=2 CMR sets in a report configuration to avoid reporting two beams from the same TRP 205. In accordance with the first technique, each CMR set may correspond to beams from a specific TRP 205 and CMRs in the same reported group may be constrained to be associated with (e.g., selected from) different CMR sets. A second technique may be that instead of a single reported group, the UE 115 may report N groups with 2 beams per group in a single report. As such, different beams within a pair or group may be received simultaneously, the number of groups N may be configured (e.g., radio resource control (RRC) configured) based on a (e.g., UE) capability of $N_{max}=\{1,2,3,4\}$, and the report may be aperiodic, semi-persistent, or periodic. Further, L1-RSRP may be exclusively supported as a report quantity, where differential reporting across all the report groups may be used to reduce overhead and CRI is indicated by index within each CMR group in the report.

As such, if the TRP 205-*a* transmits one or more CSI-RSs using CMRs from a first CMR set including a first set of one or more CMRs and the TRP 205-*b* transmits one or more CSI-RSs using CMRs from a second CMR set including a second set of one or more CMRs, a first reported CMR in each row of a report may be associated with the first CMR set if an indicator is equal to 0. Otherwise, the first reported CMR in each row may be associated with the second CMR set. The indicator, which may be a 1-bit indicator, may indicate which CMR set is associated with a largest RSRP value in all groups. Accordingly, in some examples, a first RSRP value associated with the TRP 205-*a* in a first reported group of beams may be indicated by a CRI value plus a 7-bit RSRP value to indicate an absolute value for the largest RSRP and a second RSRP value associated with the TRP 205-*b* in the first reported group of beams may be indicated by a CRI value plus a 4-bit RSRP value to indicate a differential RSRP value. Further, in such examples, a third RSRP value associated with the TRP 205-*a* in a second reported group of beams may be indicated by a CRI value plus a 4-bit RSRP value to indicate a differential RSRP value and a fourth RSRP value associated with the TRP 205-*b* in the second reported group of beams may be indicated by a CRI value plus a 4-bit RSRP value to indicate a differential RSRP value. In some aspects, the differential RSRP values may be relative to the absolute RSRP value. Further, a CRI value in the report may be indexed within each CMR set.

At step 315, which may include a CSI measurement and report from the TRP 205-*a* and the TRP 205-*b*, the UE 115 may use one of multiple different CSI measurement and reporting techniques. In some aspects, the TRP 205-*a* and the TRP 205-*b* may each use two ports for non-zero power (NZP) CSI-RS for CSI measurement during step 315 (e.g., the vertical lines illustrated at each TRP transmit beam may indicate how many ports are associated with that TRP transmit beam or a transmission via that TRP transmit beam). In some examples, and as illustrated by step 315-*a*, the UE 115 may support one CSI processing unit (CPU) with two channel measurement resources (CMRs) that are quasi-collocated with different TRP beams. One or more interference measurement resources (IMRs), if configured, may be used by the UE 115 to capture or measure interference from out of the cluster. As illustrated by the step 315-*a*, the UE 115 may use different receive beams 345 to measure CSI-RS transmissions from the TRP 205-*a* via a transmit beam 340 and CSI-RS transmissions from the TRP 205-*b* via a transmit beam 350. In some aspects, the transmit beam 340 used by the TRP 205-*a* may be associated with a first CMR (e.g., CMR-1) and the transmit beam 350 used by the TRP 205-*b* may be associated with a second CMR (e.g., CMR-2). The first CMR and the second CMR may be in a same slot or may be in different slots.

In some other examples, and as illustrated by the step 315-*b*, the UE 115 may configure two CPUs, where one pair of CMR and IMR is configured for each CPU. The UE 115 may use the IMR to capture or measure interferences from inter-layer (e.g., from the other TRP 205) or out of the cluster. Different CQIs may be reported for different CPUs (e.g., for different TRPs 205). In some aspects, how to select a common modulation and coding scheme at step 315-*b* may be up to a network implementation decision. As illustrated by the step 315-*b*, the UE 115 may use different receive beams 345 to measure CSI-RS transmissions from the TRP 205-*a* via a transmit beam 340 and CSI-RS transmissions from the TRP 205-*b* via a transmit beam 350 at different times. For example, in a first measurement occasion associated with a first CSI process or CPU (CPU 1), the transmit beam 340 used by the TRP 205-*a* may be associated with a first CMR (e.g., CMR-1) and the transmit beam 350 used by the TRP 205-*b* may be associated with a first IMR (e.g., IMR-1). In a second measurement occasion associated with a second CSI process or CPU (CPU 2), the transmit beam 340 used by the TRP 205-*a* may be associated with a second IMR (e.g., IMR-2) and the transmit beam 350 used by the TRP 205-*b* may be associated with a second CMR (e.g., CMR-2).

At step 320, the UE 115 may receive, via one or more receive beams 345, one or more downlink transmissions from the one or both of the TRP 205-*a* via the transmit beam 340 and the TRP 205-*b* via the transmit beam 350. For example, the UE 115 may receive a PDCCH transmission and a PDSCH transmission from the TRP 205-*a* and may receive a PDSCH transmission from the TRP 205-*b*. The PDCCH transmission and the PDSCH transmission from the TRP 205-a may completely or partially overlap in time or may not overlap in time with the PDSCH transmission from the TRP 205-b.

The PDSCH transmissions from the TRP 205-a and the TRP 205-b may each be associated with 1 transport block (TB), 2 layers, and different TCI states. For example, the transmit beam 340 may be associated with a first TCI state (e.g., TCI-30) and the transmit beam 350 may be associated with a second TCI state (e.g., TCI-62). The UE 115 may perform joint decoding or separate decoding to obtain or receive information from one or more of the PDCCH transmission and the PDSCH transmissions.

In some examples, the UE 115, the TRP 205-a, and the TRP 205-b may support multi-downlink control information (DCI) operation according to which the UE 115 may receive DCI from each of the TRP 205-a and the TRP 205-b (e.g., that schedules communication on that respective TRP 205). In such examples, the PDSCH transmissions may be associated with separate TBs and independent parameter configurations (e.g., independent MCS values). The PDSCH transmissions may be time division multiplexed, frequency division multiplexed, or space division multiplexed. Multi-DCI operation may be compliant with some CSI report frameworks (such as CSI report frameworks associated with multiple CPUs). Further, from a baseband processing point of view, multi-DCI operation may be similar to carrier aggregation operation. In some other examples, the UE 115, the TRP 205-a, and the TRP 205-b may support single DCI operation according to which the UE 115 may receive (e.g., from the anchor TRP 205-a) a single DCI that schedules downlink or uplink data transmissions at either the TRP 205-a or the TRP 205-b. In single DCI operation, the PDSCH transmissions may be associated with a single TB and same parameter configurations (e.g., same MCS values).

In accordance with the example implementations described herein, the UE 115, the TRP 205-a, and the TRP 205-b may employ a conditional, and signaling-based or signaling-led, scheduling restriction at the UE 115 for one or more time periods associated with the multi-TRP beam management procedure 300. The one or more time periods for which the scheduling restriction applies may span an entirety of the multi-TRP beam management procedure 300 or may span any one or more sub-intervals of the multi-TRP beam management procedure 300. In some implementations, for example, the UE 115 may request for a scheduling restriction to apply, or not apply, for one or more time intervals associated with the step 310. In other words, the UE 115 may transmit a request to enable or disable a scheduling restriction during the group-based L1-RSRP measurement from multiple TRPs 205 of step 310.

Figure 4:
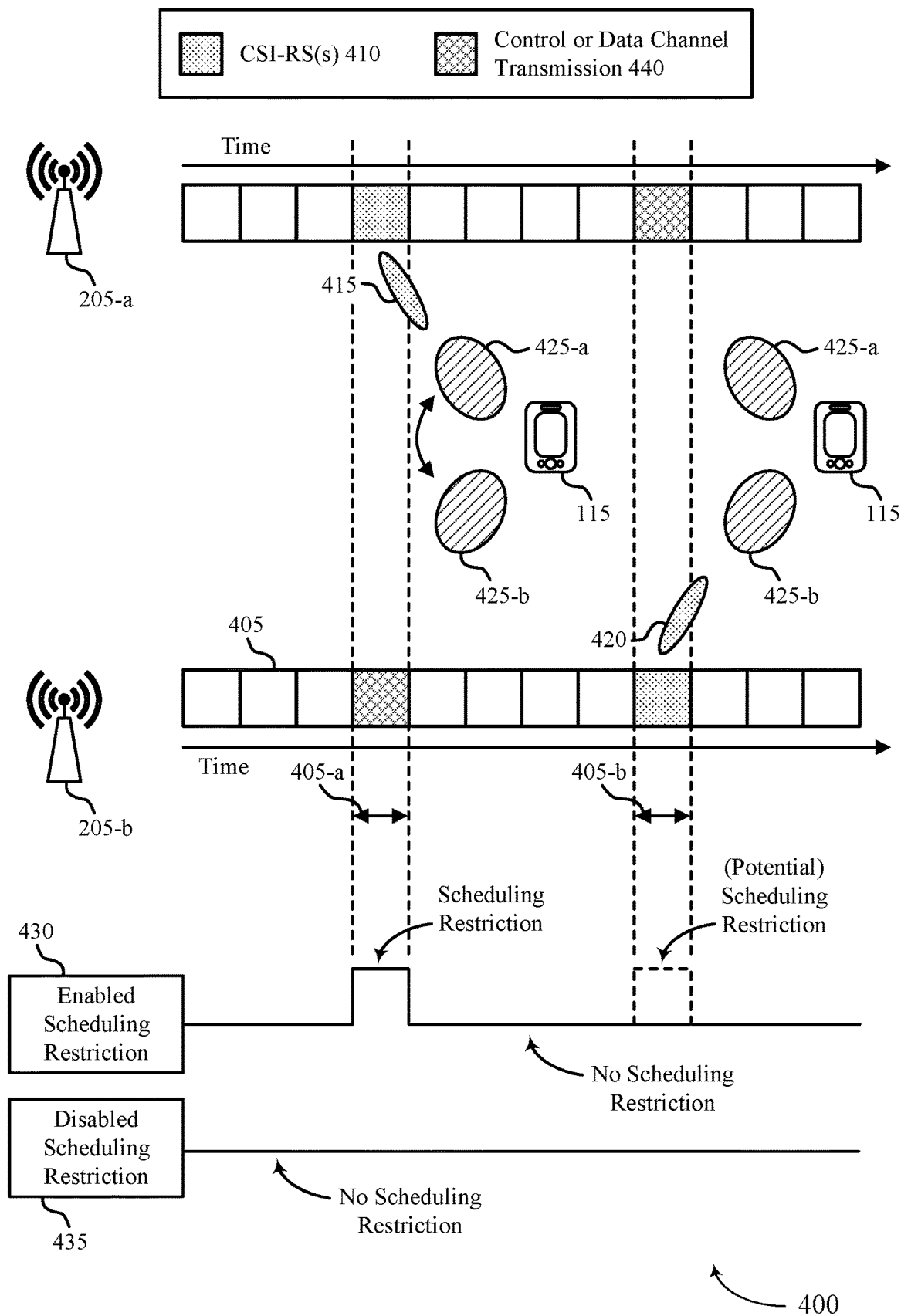
FIG. 4 shows an example of a communication timeline that supports scheduling restrictions during a group-based measurement for multiple TRPs in accordance with one or more aspects of the present disclosure.

FIG. 4 shows an example of a communication timeline 400 that supports scheduling restrictions during a group-based measurement for multiple TRPs in accordance with one or more aspects of the present disclosure. The communication timeline 400 may implement or be implemented to realize or facilitate aspects of the wireless communications system 100, the multi-TRP deployment 200, or the multi-TRP beam management procedure 300. For example, the communication timeline 400 illustrates conditionally-applicable scheduling restrictions (in accordance with a UE request) during a group-based reference signal measurement. The group-based reference signal measurement may involve a UE 115, a TRP 205-a, and a TRP 205-b, which may be examples of corresponding devices described herein, including those illustrated by and described with reference to FIGS. 1-3.

The communication timeline 400 illustrates an example in which CMRs of a group-based reference signal measurement, such as the group-based L1-RSRP measurement of step 310 as illustrated by and described with reference to FIG. 3, are time division multiplexed across a number of slots 405. For example, the TRP 205-a may transmit one or more CSI-RSs 410 via a transmit beam 415 during a slot 405-a and the TRP 205-b may transmit one or more CSI-RSs 410 via a transmit beam 420 during a slot 405-b. The UE 115 may use a directional beam 425-a and a directional beam 425-b to monitor for the CSI-RSs 410 transmitted from the TRP 205-a and the TRP 205-b, respectively. In some examples, the directional beam 425-a and the directional beam 425-b may be associated with a same phased array module 210 of the UE 115. In some other examples, the directional beam 425-a and the directional beam 425-b may be associated with different phased array modules 210.

In some network deployments, network entities 105 (e.g., including or associated with one or both of the TRP 205-a and the TRP 205-b) may employ no scheduling restriction when a UE 115 is performing an L1-RSRP measurement (e.g., on an FR2 frequency band) for the case where the reference signal for the L1-RSRP measurement is a CSI-RS which is quasi-collocated with an active TCI state for PDCCH or PDSCH and not in a CS-RS resource set with repetition set to ON, and N=1. As such, there may be no scheduling restrictions due to L1-RSRP measurement performed based on the CSI-RS in such scenarios and, accordingly, the network may presume the UE 115 to have scheduling availability. In other words, the UE 115 may be expected to be able to measure L1-RSRP while attempting to decode PDCCH and receive PDSCH, if scheduled.

Otherwise (e.g., for the case where the reference signal for L1-RSRP measurement is a reference signal which is not quasi-collocated with the active TCI state for PDCCH or PDSCH or is a reference signal resource set with repetition set to ON), the UE 115 may not be expected to transmit uplink signaling or receive downlink signaling on symbols associated with signaling that is configured for L1-RSRP measurement. Uplink signaling may include physical uplink control channel (PUCCH) transmissions, physical uplink shared channel (PUSCH) transmissions, or sounding reference signal (SRS) transmissions, or any combination thereof, and downlink signaling may include PDCCH transmissions, PDSCH transmissions, CSI-RS for tracking, or CSI-RS for QQI, or any combination thereof.

For such cases, the UE may not be expected to transmit uplink signaling or receive downlink signaling on or during symbols corresponding to synchronization signal block (SSB) indexes configured for L1-RSRP measurement, or symbols corresponding to a periodic, semi-persistent, or aperiodic CSI-RS resource configured for L1-RSRP measurement (when the resource is activated, if semi-persistent, or when the reporting is triggered, if aperiodic). As such, the UE 115 may be unable to simultaneously receive from a first of the TRP 205-a and the TRP 205-b when performing an L1-RSRP measurement for a second of the TRP 205-a and the TRP 205-b, as, from the perspective of the first, the UE 115 may be performing an L1-RSRP measurement using a non-active TCI state.

In some deployments, such static and inflexible scheduling restrictions may result in relatively poor data rates, increased communication failures, or added latency, or any combination thereof. For example, in multi-TRP deployments (such as the multi-TRP deployment 200) in which the UE 115 may communicate the TRP 205-a and the TRP 205-b using either a same phased array module 210 or different phased array modules 210, or otherwise with potentially different directional beams than the UE 115 may otherwise use for reception of control or data channel transmissions, such beam variability at the UE 115 may impact whether a scheduling restriction is suitable for the UE 115. In other words, as part of a group-based reference signal measurement, the UE 115 may or may not use different directional beams than the UE 115 may otherwise use outside of the group-based reference signal measurement (e.g., for PDCCH or PDSCH reception, for a non-group-based reference signal measurement from a single TRP 205, etc.), and whether the UE 115 uses different directional beams may impact whether a scheduling restriction is suitable at the UE 115.

Accordingly, in some implementations, the UE 115, the TRP 205-a, and the TRP 205-b may support a signaling-based mechanism according to which the UE 115 may transmit a request to enable or disable a scheduling restriction at the UE 115 for a time period associated with a group-based reference signal measurement (e.g., a group-based L1-RSRP measurement). The UE 115 may transmit the request to one or more network entities 105, which may include a base station 140 that controls or schedules one or both of the TRP 205-a and the TRP 205-b, or one or both of the TRP 205-a and the TRP 205-b themselves, or any combination thereof. The request may be an explicit request to enable or disable the scheduling restriction or may be signaling or messaging that implicitly indicates a request to enable or disable the scheduling restriction. Additional details relating to the signaled request, including triggers for transmitting request and responsive signaling from the one or more network entities, are illustrated by and described with reference to FIG. 5.

In implementations in which the UE 115, the TRP 205-a, and the TRP 205-b employ an enabled scheduling restriction 430, the UE 115, the TRP 205-a, and the TRP 205-b may implement a scheduling restriction during the slot 405-a and, in some scenarios, during the slot 405-b. For example, the slot 405-a may include a CSI-RS for L1-RSRP measurement resource that is quasi-collocated with an active TCI state for PDCCH or PDSCH and not in a CSI-RS resource set with repetition set to ON, and N=1, and the UE 115 and the TRPs 205 may implement a scheduling restriction for the slot 405-a in accordance with the described signaling-based mechanism.

In some examples, the UE 115 and the TRPs 205 may employ the scheduling restriction for the slot 405-a in accordance with the UE 115 using sub-array-based receive beams that are able to co-exist for multi-TRP-based downlink reception, but which may have directivity gains that fail to satisfy a directivity gain threshold. In other words, the UE 115 and the TRPs 205 may employ the scheduling restriction for the slot 405-a due to an SNR loss at the UE 115 resulting from use of sub-array beams with relatively lower directivity gain as compared to full-array beams. In accordance with the scheduling restriction, the UE 115 may expect limited or no PDCCH or PDSCH transmissions from the TRP 205-a during the slot 405-a.

The UE 115 and the TRPs 205 may, even when the scheduling restriction is enabled, selectively employ the scheduling restriction during the slot 405-b. For example, the UE 115 and the TRPs 205 may employ the scheduling restriction during the slot 405-b depending on whether a TCI state associated with the TRP 205-b is active. In scenarios in which the TCI state associated with the TRP 205-b is inactive (such that the UE 115 and the TRP 205-b have yet to establish a communication link), the UE 115 and the TRPs 205 may refrain from employing the scheduling restriction during the slot 405-b (as such a scheduling restriction may be unnecessary, since the UE 115 may not expect to receive PDCCH or PDSCH transmissions from the TRP 205-b yet anyway). In other words, the CSI-RS for L1-RSRP measurement resource used by the TRP 205-b may be quasi-collocated with a non-active TCI for PDCCH or PDSCH transmissions and not in a CSI-RS resource set with repetition set to ON, and N=1. Alternatively, in scenarios in which the TCI state associated with the TRP 205-b is active (such that the UE 115 and the TRP 205-b have established a communication link), the UE 115 and the TRPs 205 may employ the scheduling restriction during the slot 405-b in accordance with the enabled scheduling restriction 430, and the UE 115 may expect limited or no PDCCH or PDSCH transmissions from the TRP 205-b during the slot 405-b accordingly.

In implementations in which the UE 115, the TRP 205-a, and the TRP 205-b employ a disabled scheduling restriction 435, the UE 115, the TRP 205-a, and the TRP 205-b may refrain from implementing a scheduling restriction during any time period associated with the group-based reference signal measurement. For example, the slot 405-a and the slot 405-b may both include a CSI-RS for L1-RSRP measurement resource that is quasi-collocated with an active TCI state for PDCCH or PDSCH and not in a CSI-RS resource set with repetition set to ON, and N=1, and the UE 115 and the TRPs 205 may refrain from implementing a scheduling restriction for the slots 405 associated with the group-based reference signal measurement in accordance with the described signaling-based mechanism.

In some examples, the UE 115 and the TRPs 205 may refrain from employing the scheduling restriction in accordance with the UE 115 using receive beams from different phased array modules 210, which may have directivity gains that satisfy a directivity gain threshold. In other words, the UE 115 and the TRPs 205 may refrain from employing the scheduling restriction due to the UE 115 maintaining a suitable SNR resulting from use of full-array beams with relatively higher directivity gain as compared to sub-array beams. For example, the UE 115 and the TRPs 205 may employ the disabled scheduling restriction 435 in accordance with the UE 115 using separate panel-based receive beams that can co-exist for multi-TRP-based downlink reception.

As such, the UE 115 may still receive PDCCH or PDSCH from a first TRP 205 while measuring L1-RSRP from a second TRP 205 (e.g., by way of using multiple panels at the UE 115). Accordingly, one or more network entities 105 (e.g., a base station 140 that controls or schedules one or both of the TRP 205-a and the TRP 205-b, or one or both of the TRP 205-a and the TRP 205-b themselves, or any combination thereof) may schedule a first set of one or more control or data channel transmissions 440 for the TRP 205-b during the slot 405-a or may schedule a second set of one or more control or data channel transmissions 440 for the TRP 205-a during the slot 405-b. Likewise, the UE 115 may monitor for control or data channel transmissions 440 (which may include PDCCH or PDSCH transmissions) during at least the slot 405-a and the slot 405-b from the TRP 205-b and the TRP 205-a, respectively.

Figure 5:
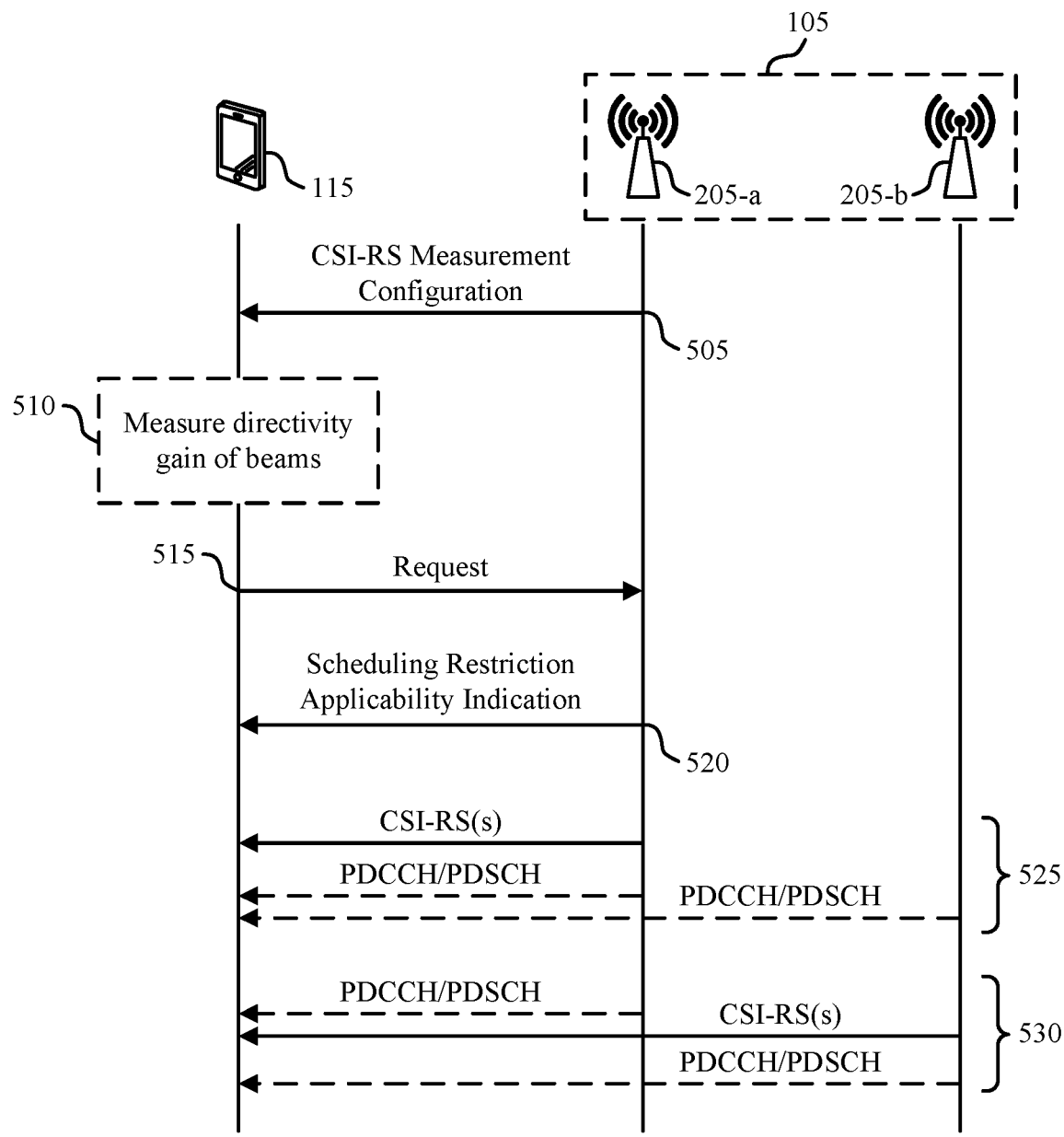
FIG. 5 shows an example of a process flow that supports scheduling restrictions during a group-based measurement for multiple TRPs in accordance with one or more aspects of the present disclosure.

FIG. 5 shows an example of a process flow 500 that supports scheduling restrictions during a group-based measurement for multiple TRPs in accordance with one or more aspects of the present disclosure. The process flow 500 may implement or be implemented to realize or facilitate aspects of the wireless communications system 100, the multi-TRP deployment 200, the multi-TRP beam management procedure 300, or the communication timeline 400. For example, the process flow 500 illustrates communication between a UE 115, a TRP 205-a, and a TRP 205-b, which may be examples of corresponding devices as illustrated by and described with reference to FIGS. 1-4. In some implementations, the UE 115 and the TRPs 205 may support a signaling-based mechanism according to which the UE 115 may transmit a request to enable or disable a scheduling restriction for a time period associated with a group-based reference signal measurement.

In the following description of the process flow 500, the operations may be performed (such as reported or provided) in a different order than the order shown, or the operations performed by the example devices may be performed in different orders or at different times. For example, specific operations also may be left out of the process flow 500, or other operations may be added to the process flow 500. Further, although some operations or signaling may be shown to occur at different times for discussion purposes, these operations may actually occur at the same time. Further, the signaling illustrated by and described with reference to FIG. 5 may include one or more uplink control information (UCI) messages, one or more DCI messages, RRC signaling, one or more MAC control elements (MAC-CEs), or one or more data messages, or any combination thereof.

At 505, the UE 115 may receive, from a network entity 105, a CSI-RS measurement configuration. For example, the UE 115 may receive an indication of multiple CMRs for a group-based reference signal measurement. In some implementations, the UE 115 may receive an indication of a first set of CMRs for the TRP 205-a and a second set of CMRs for the TRP 205-b. The UE 115 may use the CSI-RS measurement configuration to perform, for example, the multi-TRP beam management procedure 300 including the group-based reference signal measurement.

At 510, the UE 115 may, in some implementations, measure a directivity gain of each of multiple directional beams that the UE 115 uses for the group-based reference signal measurement. For example, the UE 115 may measure, identify, estimate, calculate, or otherwise determine a directivity gain of one or more directional beams that the UE 115 may use to measure reference signal transmissions from the TRP 205-a and a directivity gain of one or more directional beams that the UE 115 may use to measure reference signal transmissions from the TRP 205-b. In some aspects, the directional beams used by the UE 115 may have relatively higher directivity gains if the UE 115 uses separate phased array modules 210 (e.g., separate antenna panels) to track or measure reference signal transmissions from each of the TRP 205-a and the TRP 205-b. Alternatively, the directional beams used by the UE 115 may have relatively lower directivity gains if the UE 115 uses a same phased array module (e.g., a same antenna panel) to track or measure reference signal transmissions from each of the TRP 205-a and the TRP 205-b.

At 515, the UE 115 may transmit, to the network entity 105 and in accordance with the multiple CMRs being for the group-based reference signal measurement, a request to enable or disable a scheduling restriction at the UE 115 for a time period, the time period associated with one or more of the multiple CMRs.

In cases in which the reference signal for L1-RSRP measurement is a CSI-RS that is quasi-collocated with an active TCI state for PDCCH or PDSCH and not in a CSI-RS resource set with repetition set to ON, and N=1, the UE 115 and the TRPs 205 may employ a scheduling restriction due to (L1-RSRP) measurements performed based on the CSI-RS if the CMR is configured for group-based measurements from multiple TRPs 205. In such cases, the UE 115 may transmit the request to enable the scheduling restriction if one or more of the directional beams used by the UE 115 cannot achieve a same directivity gain as the gain that can be obtained for non-group-based measurement.

The UE 115 may request two different types of scheduling restrictions depending on a loss in directivity gain. In some implementations, the UE 115 may request a higher PDCCH aggregation level or a lower rank or MCS of PDSCH, or both, if the directivity gain still meets a next lower level of SNR from a given TRP 205 (e.g., if the directivity gain fails to satisfy a first threshold triggering enablement of a scheduling restriction but satisfies a second, lower threshold). In other words, the UE 115 may request for a lower effective code rate for PDCCH and PDSCH such that the effective code rate for the PDCCH and the PDSCH is not based on a CSI report made expecting the UE 115 to receive PDCCH or PDSCH from a single TRP 205.

In some implementations, the UE 115 may request "no PDCCH or PDSCH scheduling" on the symbols or slots where group-based measurement resources are configured if the directivity gain does not meet the next lower level of SNR (e.g., the second, lower threshold). As such, for example, a first directivity gain threshold may trigger enablement of a scheduling restriction and a second, lower directivity gain threshold may trigger a complete restriction against any scheduling of PDCCH or PDSCH, where a directivity gain between the first directivity gain threshold and the second directivity gain threshold triggers the lower effective code rate.

In cases in which the UE 115 can measure the group-based measurement resources without directivity gain being compromised (e.g., if the UE 115 uses multiple panels), the UE 115 may not request any scheduling restriction or may transmit a request to disable a scheduling restriction. For example, in cases in which the reference signal for L1-RSRP measurement is a CSI-RS which is not quasi-collocated with an active TCI state (from a perspective of a first TRP 205) for PDCCH or PDSCH (and not in a CSI-RS resource set with repetition set to ON, and N=1), there may be no scheduling restriction due to (L1-RSRP) measurement performed based on the CSI-RS from a second TRP 205 if the CMR is configured for group-based measurements from multiple TRPs 205.

For example, the UE 115 may request to disable a scheduling restriction if a receive beam for the measurement can achieve a same or similar directivity gain as the gain that can be obtained for a non-group-based measurement. In other words, if the UE 115 is able to measure the group-based measurement resources without directivity gain being compromised (e.g., if the UE 115 performs measurements by using multiple panels with one panel for each TRP 205), the UE 115 may transmit a request to disable a scheduling restriction.

Further, the request to enable or disable a scheduling restriction may include an explicit indication of one of a request to enable or a request to disable, or may implicitly indicate one of a request to enable or a request to disable. In implementations in which the request is implicitly indicated, the UE 115 may inform the network entity 105 that the UE 115 uses one or more different receive beams for PDSCH than the UE 115 uses for the group-based reference signal measurement, that the UE 115 uses a same phased array module 210 for the directional beams oriented toward different TRPs 205, or that one or more directivity gains associated with the directional beams used by the UE 115 for the group-based reference signal measurement fail to satisfy one or more threshold directivity gains, or any combination thereof. In some aspects, the UE 115 may inform the network entity of such a difference in receive beams when asked to perform a group-based reference signal measurement at the same time as the UE 115 may be expected to monitor for PDCCH or PDSCH transmissions.

A threshold directivity gain against which the UE 115 may compare a directivity gain of a directional beam used for the group-based reference signal measurement may be TRP-specific, phased array module-specific, or UE-specific and may be configured or statically or dynamically signaled. As such, the UE 115 may compare against one or multiple threshold directivity gains (or one or more multiple sets of directivity gains). For example, the UE 115 may compare a first directivity gain associated with a first directional beam oriented toward the TRP 205-a to a first threshold directivity gain (or a first set of threshold directivity gains, which may be applicable in scenarios in which the UE 115 may request either a lower effective code rate or a complete restriction against PDCCH and PDSCH scheduling) and may compare a second directivity gain associated with a second directional beam oriented toward the TRP 205-b to a second threshold directivity gain (or a second set of threshold directivity gains). Alternatively, the UE 115 may compare the first directivity gain and the second directivity gain to a same threshold directivity gain (or a same set of threshold directivity gains).

At 520, the network entity 105 (via one of the TRP 205-a and the TRP 205-b) may transmit, to the UE 115, a scheduling restriction applicability indication. For example, the network entity 105 may transmit information associated with the scheduling restriction at the UE 115 in accordance with the request received from the UE 115. In other words, the network entity 105 may explicitly signal a scheduling restriction based on the UE request. Accordingly, in some implementations, the network entity 105 may explicitly signal a scheduling restriction if the UE 115 requests to enable a scheduling restriction. In some other implementations, the network entity 105 may explicitly signal "no" scheduling restriction if the UE 115 requests to disable a scheduling restriction. As such, the UE 115 and the network entity 105 may support a conditional scheduling availability of the UE 115 when performing a group-based (L1-RSRP) measurement (e.g., on FR2 or another beam-based frequency range).

At 525, the TRP 205-a may transmit a set of one or more CSI-RSs to the UE 115 using one or more CMRs associated with the group-based reference signal measurement and, in implementations in which the UE 115 and the network entity 105 negotiate or signal "no" scheduling restriction, one or both of the TRP 205-a and the TRP 205-b may transmit one or more control or data channel transmissions that at least partially overlap in time with the one or more CMRs. In such implementations of no scheduling restriction, whether one or both of the TRP 205-a and the TRP 205-b transmit one or more control or data channel transmissions may depend on which of the TRP 205-a and the TRP 205-b, if not both, are associated with an active TCI state. In implementations in which the UE 115 and the network entity 105 negotiate or signal a scheduling restriction, the UE 115 may attempt to receive one or more control or data channel transmissions from the TRP 205-a or the TRP 205-b, or both, expecting a relatively lower effective code rate, or may not expect to receive any control or data channel transmissions from the TRP 205-a or the TRP 205-b, or both.

At 530, the TRP 205-b may transmit a set of one or more CSI-RSs to the UE 115 using one or more CMRs associated with the group-based reference signal measurement and, in implementations in which the UE 115 and the network entity 105 negotiate or signal "no" scheduling restriction, one or both of the TRP 205-a and the TRP 205-b may transmit one or more control or data channel transmissions that at least partially overlap in time with the one or more CMRs. In such implementations of no scheduling restriction, whether one or both of the TRP 205-a and the TRP 205-b transmit one or more control or data channel transmissions may depend on which of the TRP 205-a and the TRP 205-b, if not both, are associated with an active TCI state. In implementations in which the UE 115 and the network entity 105 negotiate or signal a scheduling restriction, the UE 115 may attempt to receive one or more control or data channel transmissions from the TRP 205-a or the TRP 205-b, or both, expecting a relatively lower effective code rate, or may not expect to receive any control or data channel transmissions from the TRP 205-a or the TRP 205-b, or both.

Figure 6:
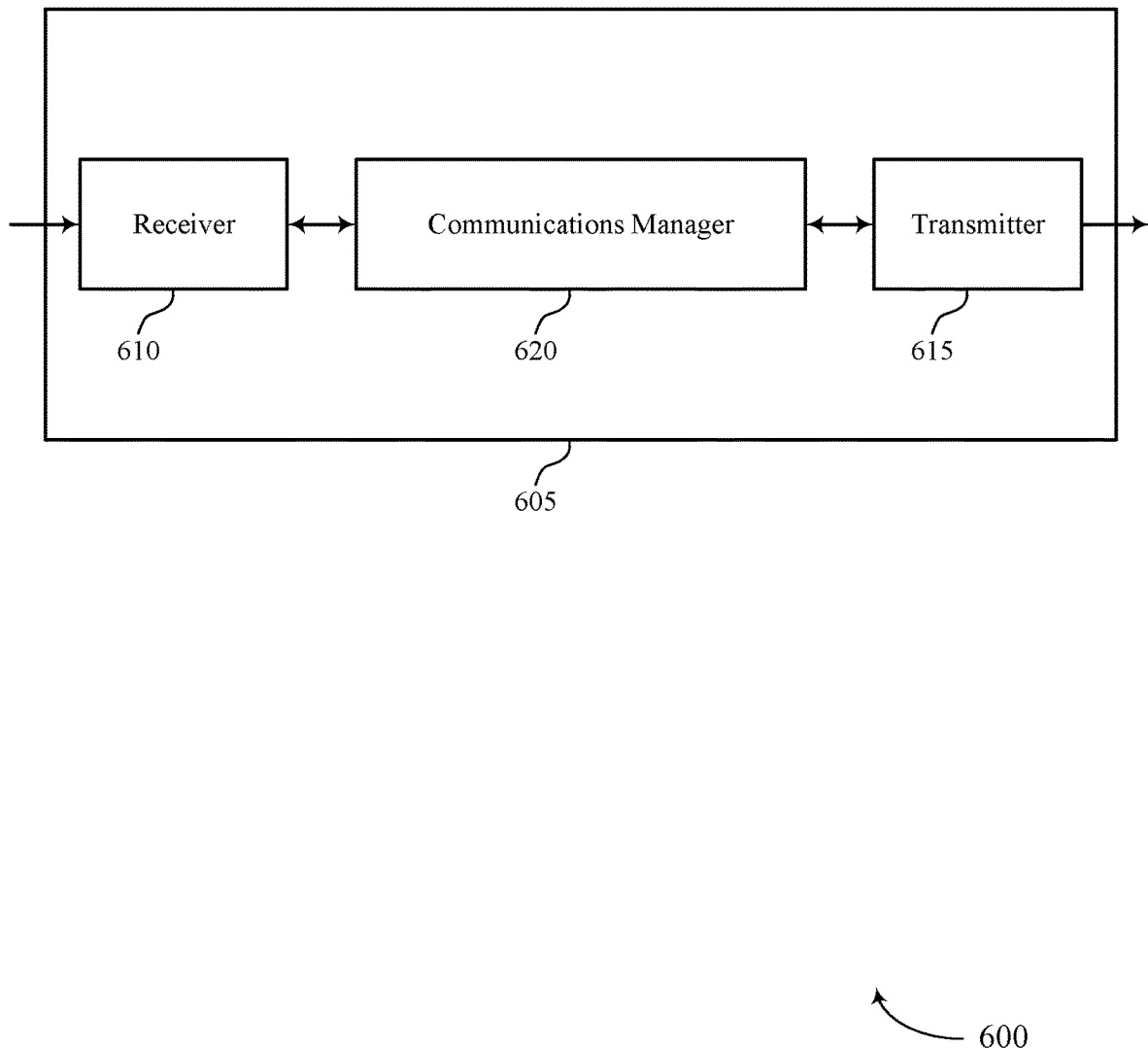
FIGS. 6 and 7 show block diagrams of devices that support scheduling restrictions during a group-based measurement for multiple TRPs in accordance with one or more aspects of the present disclosure.

FIG. 6 shows a block diagram 600 of a device 605 that supports scheduling restrictions during a group-based measurement for multiple TRPs in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to scheduling restrictions during a group-based measurement for multiple TRPs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scheduling restrictions during a group-based measurement for multiple TRPs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of scheduling restrictions during a group-based measurement for multiple TRPs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving, from a network entity, an indication of multiple channel measurement resources for a group-based reference signal measurement. The communications manager 620 may be configured as or otherwise support a means for transmitting, to the network entity in accordance with the multiple channel measurement resources being for the group-based reference signal measurement, a request to enable or disable a scheduling restriction at the UE for a time period, the time period associated with one or more of the multiple channel measurement resources. The communications manager 620 may be configured as or otherwise support a means for receiving, from the network entity, information associated with the scheduling restriction at the UE in accordance with the request.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
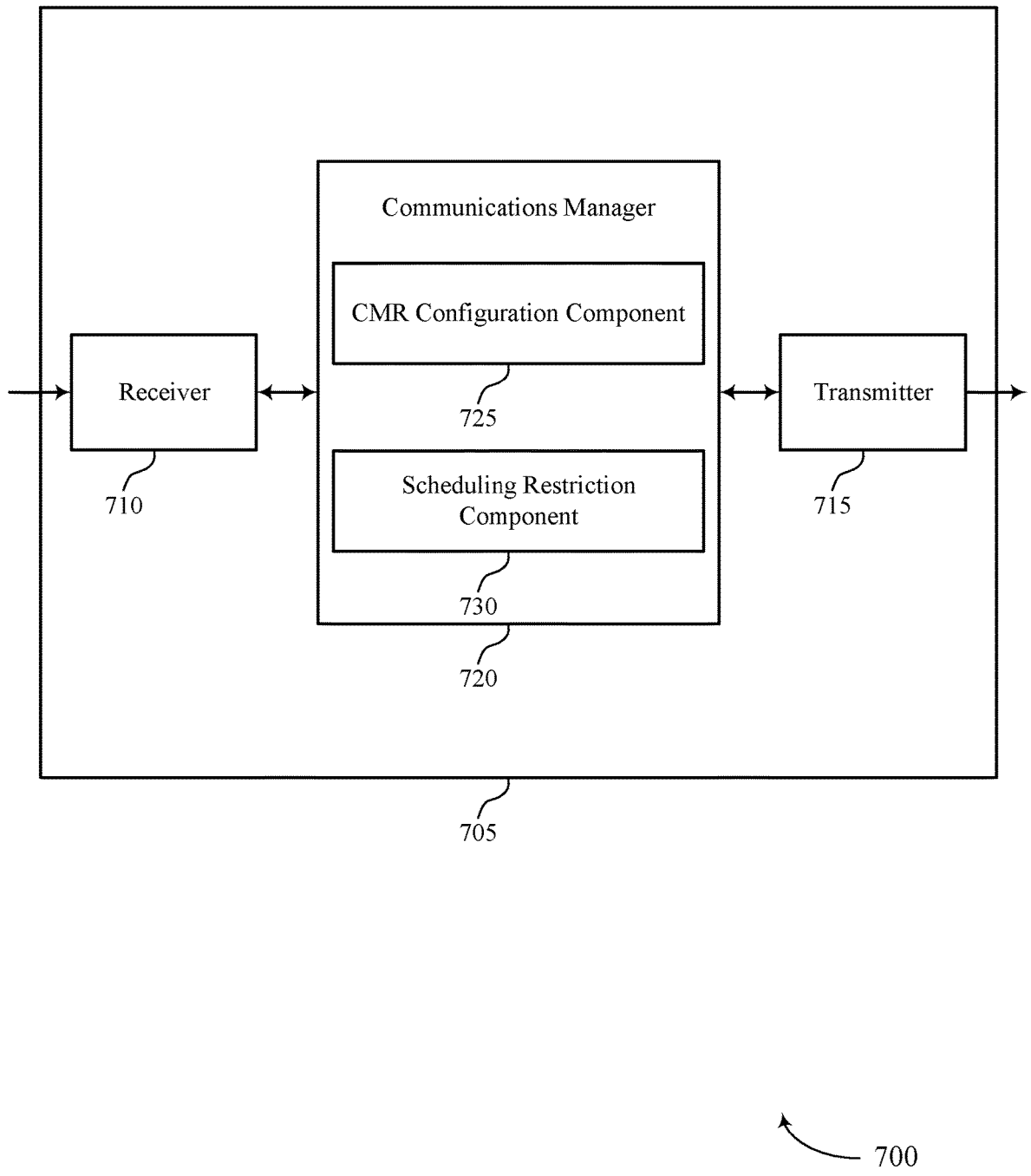

FIG. 7 shows a block diagram 700 of a device 705 that supports scheduling restrictions during a group-based measurement for multiple TRPs in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to scheduling restrictions during a group-based measurement for multiple TRPs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to scheduling restrictions during a group-based measurement for multiple TRPs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of scheduling restrictions during a group-based measurement for multiple TRPs as described herein. For example, the communications manager 720 may include an CMR configuration component 725 a scheduling restriction component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The CMR configuration component 725 may be configured as or otherwise support a means for receiving, from a network entity, an indication of multiple channel measurement resources for a group-based reference signal measurement. The scheduling restriction component 730 may be configured as or otherwise support a means for transmitting, to the network entity in accordance with the multiple channel measurement resources being for the group-based reference signal measurement, a request to enable or disable a scheduling restriction at the UE for a time period, the time period associated with one or more of the multiple channel measurement resources. The scheduling restriction component 730 may be configured as or otherwise support a means for receiving, from the network entity, information associated with the scheduling restriction at the UE in accordance with the request.

Figure 8:
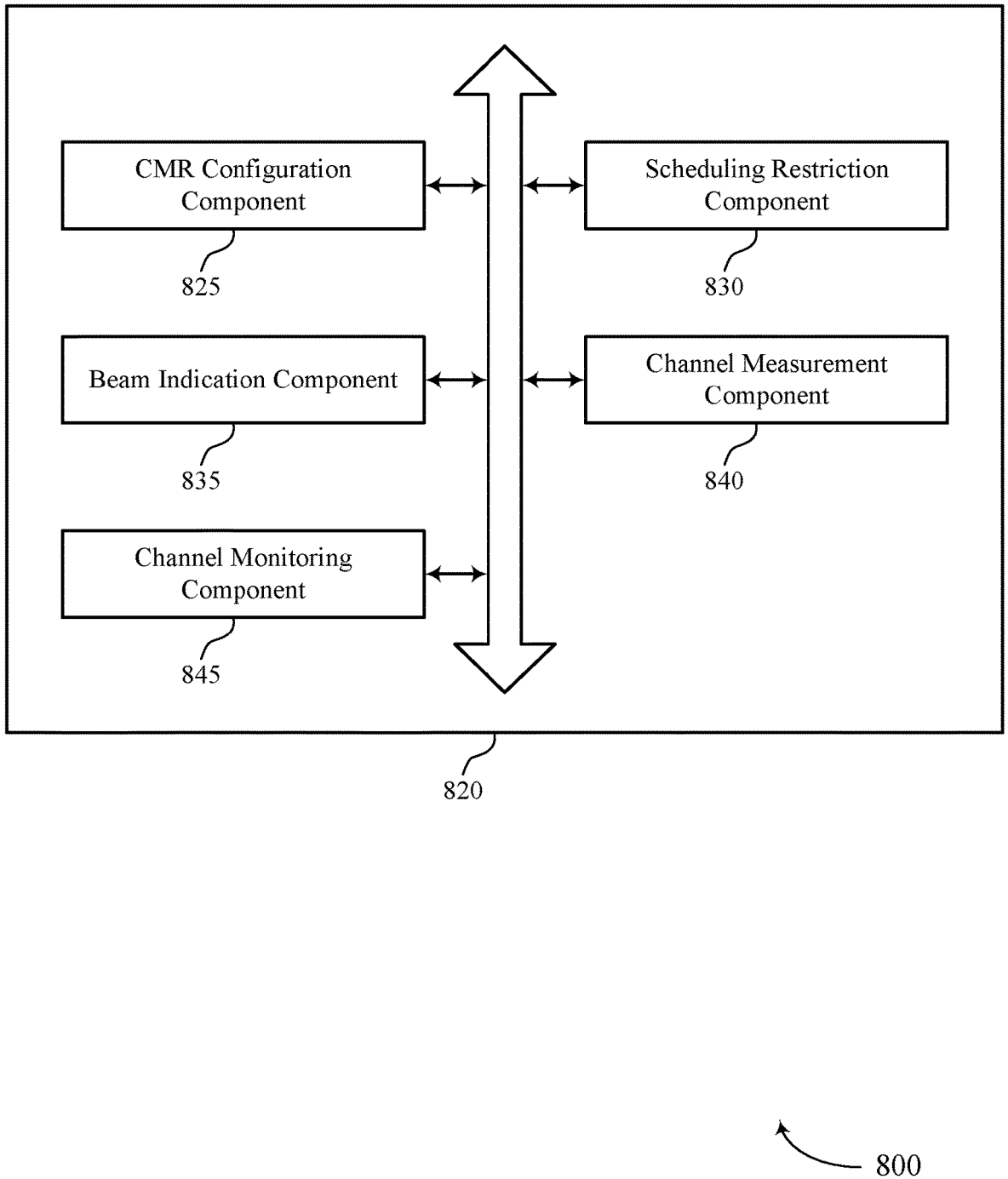
FIG. 8 shows a block diagram of a communications manager that supports scheduling restrictions during a group-based measurement for multiple TRPs in accordance with one or more aspects of the present disclosure.

FIG. 8 shows a block diagram 800 of a communications manager 820 that supports scheduling restrictions during a group-based measurement for multiple TRPs in accordance with one or more aspects of the present disclosure. The communications manager 820 may be an example of aspects of a communications manager 620, a communications manager 720, or both, as described herein. The communications manager 820, or various components thereof, may be an example of means for performing various aspects of scheduling restrictions during a group-based measurement for multiple TRPs as described herein. For example, the communications manager 820 may include an CMR configuration component 825, a scheduling restriction component 830, a beam indication component 835, a channel measurement component 840, a channel monitoring component 845, or any combination thereof. Each of these components may communicate, directly or indirectly, with one another (e.g., via one or more buses).

The communications manager 820 may support wireless communication at a UE in accordance with examples as disclosed herein. The CMR configuration component 825 may be configured as or otherwise support a means for receiving, from a network entity, an indication of multiple channel measurement resources for a group-based reference signal measurement. The scheduling restriction component 830 may be configured as or otherwise support a means for transmitting, to the network entity in accordance with the multiple channel measurement resources being for the group-based reference signal measurement, a request to enable or disable a scheduling restriction at the UE for a time period, the time period associated with one or more of the multiple channel measurement resources. In some examples, the scheduling restriction component 830 may be configured as or otherwise support a means for receiving, from the network entity, information associated with the scheduling restriction at the UE in accordance with the request.

In some examples, to support transmitting the request to enable or disable the scheduling restriction at the UE, the beam indication component 835 may be configured as or otherwise support a means for transmitting an indication of whether the UE uses a different set of one or more directional receive beams for the group-based reference signal measurement than used for reception of one or more control or data channel transmissions, where a use of one or more different directional receive beams is associated with a request to enable the scheduling restriction and a use of one or more same directional beams is associated with a request to disable the scheduling restriction.

In some examples, the channel measurement component 840 may be configured as or otherwise support a means for measuring a first channel measurement resource of the multiple channel measurement resources using a first directional receive beam and a second channel measurement resource of the multiple channel measurement resources using a second directional receive beam, where the request to enable or disable the scheduling restriction at the UE is based on a directivity gain of one or both of the first directional receive beam and the second directional receive beam.

In some examples, to support transmitting the request to enable or disable the scheduling restriction at the UE, the scheduling restriction component 830 may be configured as or otherwise support a means for transmitting a request to enable the scheduling restriction at the UE based on the directivity gain of one or both of the first directional receive beam and the second directional receive beam failing to satisfy a threshold directivity gain, where the information associated with the scheduling restriction received from the network entity indicates a presence of the scheduling restriction for the time period.

In some examples, to support transmitting the request to enable the scheduling restriction at the UE, the scheduling restriction component 830 may be configured as or otherwise support a means for transmitting an indication of one or more transmission parameters that are requested to be used for any control or data channel transmissions scheduled during the time period if the directivity gain satisfies a second threshold directivity gain, where the one or more transmission parameters include a relatively higher aggregation level, a relatively lower rank, or a relatively lower coding rate, or any combination thereof, relative to an aggregation level, a rank, or a coding rate used for control or data channel transmissions based on a non-group-based reference signal measurement.

In some examples, to support transmitting the request to enable the scheduling restriction at the UE, the scheduling restriction component 830 may be configured as or otherwise support a means for transmitting an indication of a requested restriction against scheduling any control or data channel transmissions during the time period if the directivity gain fails to satisfy a second threshold directivity gain.

In some examples, the first directional receive beam and the second directional receive beam are associated with different sub-arrays of a same antenna array of the UE. In some examples, the directivity gain failing to satisfy the threshold directivity gain is based on the first directional receive beam and the second directional receive beam being associated with the different sub-arrays of the same antenna array of the UE.

In some examples, to support transmitting the request to enable or disable the scheduling restriction at the UE, the scheduling restriction component 830 may be configured as or otherwise support a means for transmitting a request to disable the scheduling restriction at the UE based on the directivity gain of one or both of the first directional receive beam and the second directional receive beam satisfying a threshold directivity gain, where the information associated with the scheduling restriction received from the network entity indicates an absence of the scheduling restriction for the time period.

In some examples, the channel monitoring component 845 may be configured as or otherwise support a means for monitoring, using the second directional receive beam, for a first set of one or more control or data channel transmissions during a first time period that at least partially overlaps with the first channel measurement resource. In some examples, the channel monitoring component 845 may be configured as or otherwise support a means for monitoring, using the first directional receive beam, for a second set of one or more control or data channel transmissions during a second time period that at least partially overlaps with the second channel measurement resource.

In some examples, the first directional receive beam and the second directional receive beam are associated with different antenna arrays of the UE. In some examples, the directivity gain satisfying the threshold directivity gain is based on the first directional receive beam and the second directional receive beam being associated with the different antenna arrays of the UE.

In some examples, the group-based reference signal measurement is associated with reference signal measurements from multiple TRPs. In some examples, each TRP is associated with a different channel measurement resource set.

Figure 9:
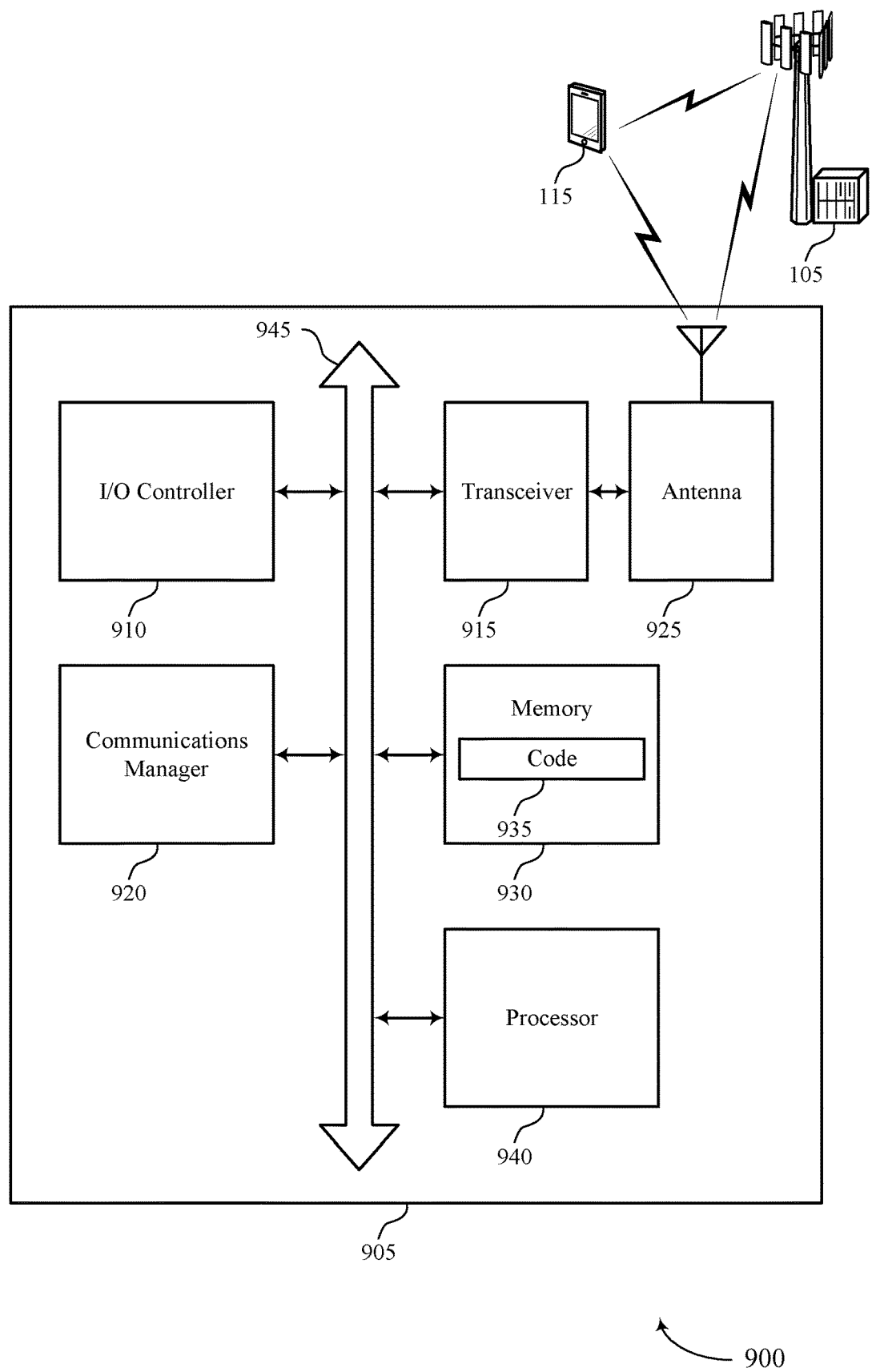
FIG. 9 shows a diagram of a system including a device that supports scheduling restrictions during a group-based measurement for multiple TRPs in accordance with one or more aspects of the present disclosure.

FIG. 9 shows a diagram of a system 900 including a device 905 that supports scheduling restrictions during a group-based measurement for multiple TRPs in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting scheduling restrictions during a group-based measurement for multiple TRPs). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a network entity, an indication of multiple channel measurement resources for a group-based reference signal measurement. The communications manager 920 may be configured as or otherwise support a means for transmitting, to the network entity in accordance with the multiple channel measurement resources being for the group-based reference signal measurement, a request to enable or disable a scheduling restriction at the UE for a time period, the time period associated with one or more of the multiple channel measurement resources. The communications manager 920 may be configured as or otherwise support a means for receiving, from the network entity, information associated with the scheduling restriction at the UE in accordance with the request.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of scheduling restrictions during a group-based measurement for multiple TRPs as described herein, or the processor 940 and the memory 930 may be otherwise configured to perform or support such operations.

Figure 10:
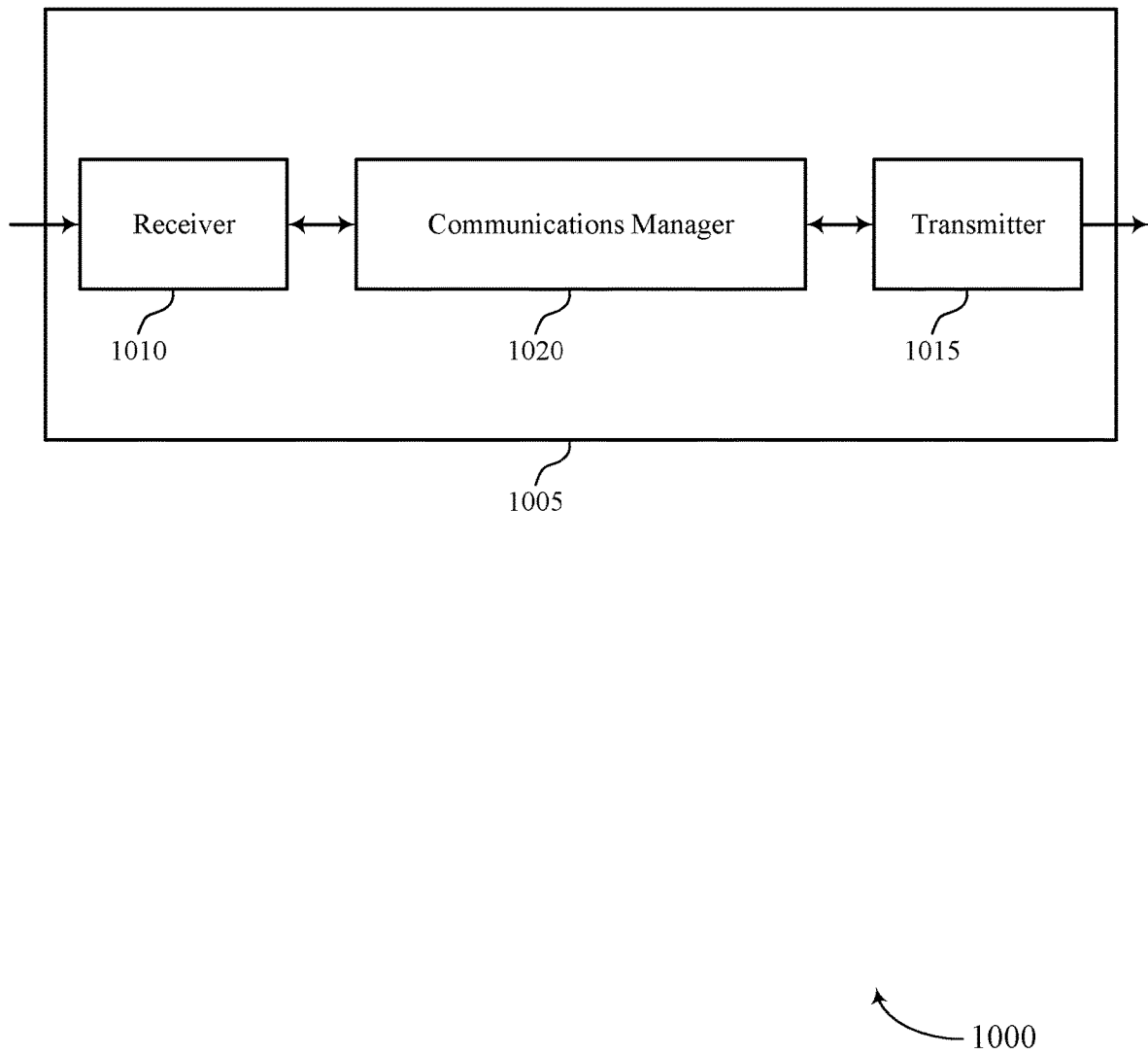
FIGS. 10 and 11 show block diagrams of devices that support scheduling restrictions during a group-based measurement for multiple TRPs in accordance with one or more aspects of the present disclosure.

FIG. 10 shows a block diagram 1000 of a device 1005 that supports scheduling restrictions during a group-based measurement for multiple TRPs in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of scheduling restrictions during a group-based measurement for multiple TRPs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for outputting an indication of multiple channel measurement resources for a group-based reference signal measurement. The communications manager 1020 may be configured as or otherwise support a means for obtaining, in accordance with the multiple channel measurement resources being for the group-based reference signal measurement, a request to enable or disable a scheduling restriction at a UE for a time period, the time period associated with one or more of the multiple channel measurement resources. The communications manager 1020 may be configured as or otherwise support a means for outputting information associated with the scheduling restriction at the UE in accordance with the request.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
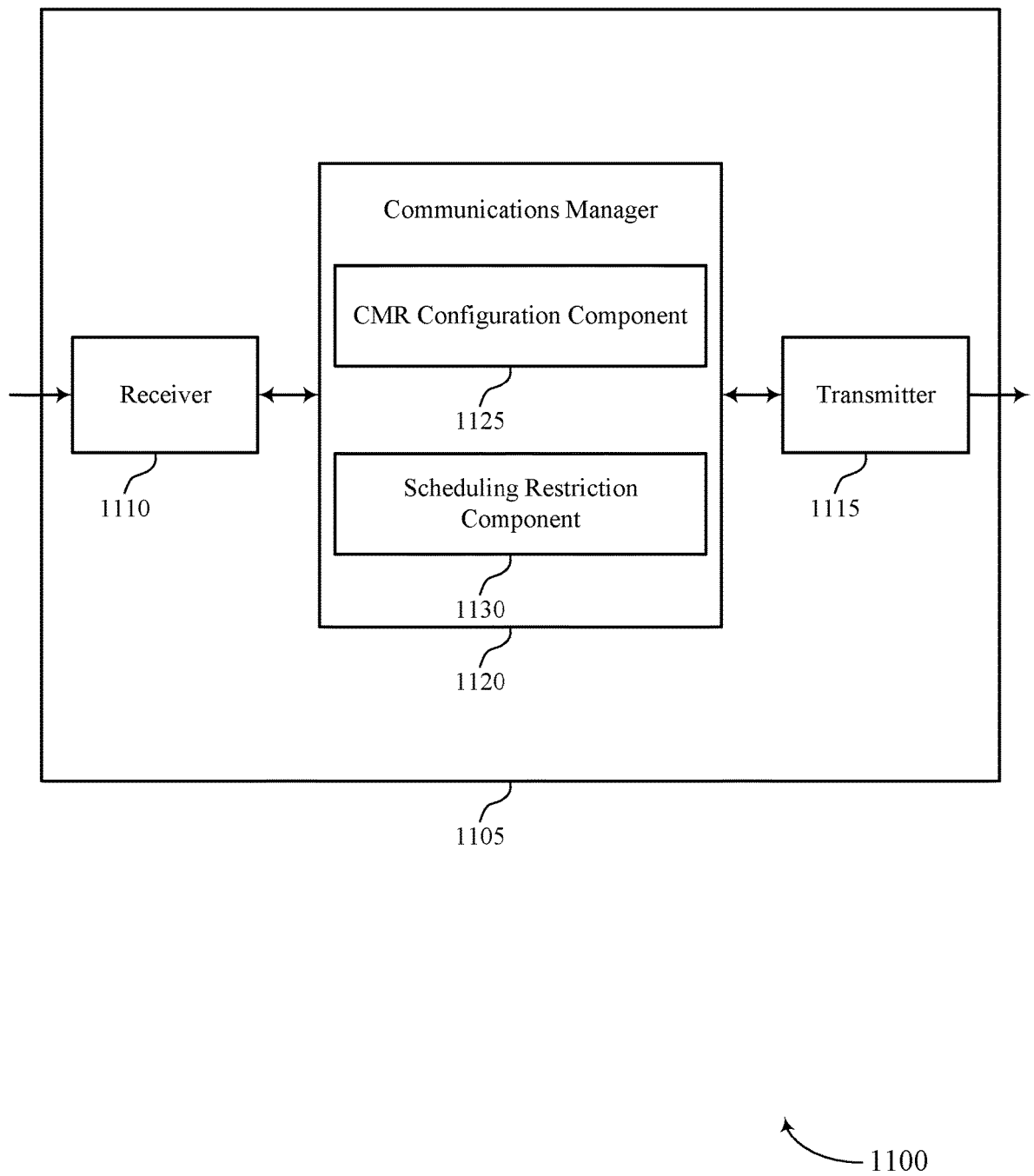

FIG. 11 shows a block diagram 1100 of a device 1105 that supports scheduling restrictions during a group-based measurement for multiple TRPs in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of scheduling restrictions during a group-based measurement for multiple TRPs as described herein. For example, the communications manager 1120 may include an CMR configuration component 1125 a scheduling restriction component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The CMR configuration component 1125 may be configured as or otherwise support a means for outputting an indication of multiple channel measurement resources for a group-based reference signal measurement. The scheduling restriction component 1130 may be configured as or otherwise support a means for obtaining, in accordance with the multiple channel measurement resources being for the group-based reference signal measurement, a request to enable or disable a scheduling restriction at a UE for a time period, the time period associated with one or more of the multiple channel measurement resources. The scheduling restriction component 1130 may be configured as or otherwise support a means for outputting information associated with the scheduling restriction at the UE in accordance with the request.

Figure 12:
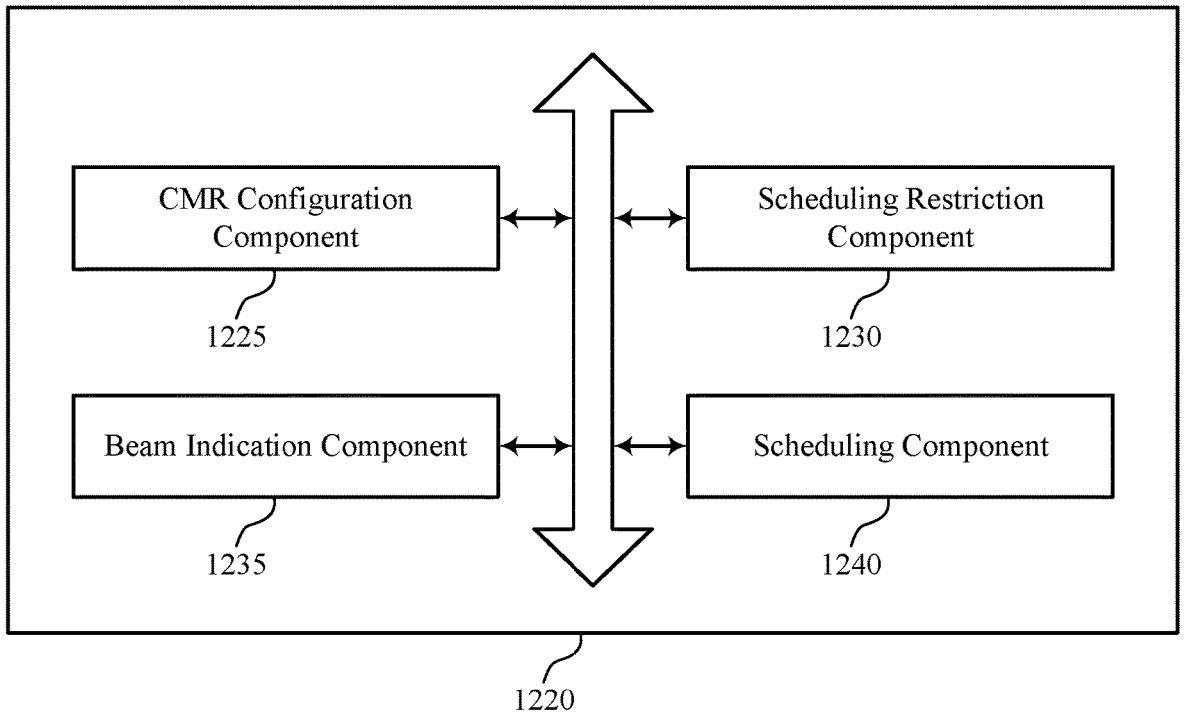
FIG. 12 shows a block diagram of a communications manager that supports scheduling restrictions during a group-based measurement for multiple TRPs in accordance with one or more aspects of the present disclosure.

FIG. 12 shows a block diagram 1200 of a communications manager 1220 that supports scheduling restrictions during a group-based measurement for multiple TRPs in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of scheduling restrictions during a group-based measurement for multiple TRPs as described herein. For example, the communications manager 1220 may include an CMR configuration component 1225, a scheduling restriction component 1230, a beam indication component 1235, a scheduling component 1240, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The CMR configuration component 1225 may be configured as or otherwise support a means for outputting an indication of multiple channel measurement resources for a group-based reference signal measurement. The scheduling restriction component 1230 may be configured as or otherwise support a means for obtaining, in accordance with the multiple channel measurement resources being for the group-based reference signal measurement, a request to enable or disable a scheduling restriction at a UE for a time period, the time period associated with one or more of the multiple channel measurement resources. In some examples, the scheduling restriction component 1230 may be configured as or otherwise support a means for outputting information associated with the scheduling restriction at the UE in accordance with the request.

In some examples, to support obtaining the request to enable or disable the scheduling restriction at the UE, the beam indication component 1235 may be configured as or otherwise support a means for obtaining an indication of whether the UE uses a different set of one or more directional receive beams for the group-based reference signal measurement than used for reception of one or more control or data channel transmissions, where a use of one or more different directional receive beams is associated with a request to enable the scheduling restriction and a use of one or more same directional beams is associated with a request to disable the scheduling restriction.

In some examples, the beam indication component 1235 may be configured as or otherwise support a means for obtaining an indication of a first directional receive beam of the UE used to measure a first channel measurement resource of the multiple channel measurement resources and a second directional receive beam of the UE used to measure a second channel measurement resource of the multiple channel measurement resources, where the request to enable or disable the scheduling restriction at the UE is based on a directivity gain of one or both of the first directional receive beam and the second directional receive beam.

In some examples, to support obtaining the request to enable or disable the scheduling restriction at the UE, the scheduling restriction component 1230 may be configured as or otherwise support a means for obtaining a request to enable the scheduling restriction at the UE based on the directivity gain of one or both of the first directional receive beam and the second directional receive beam failing to satisfy a threshold directivity gain, where the information associated with the scheduling restriction output from the network entity indicates a presence of the scheduling restriction for the time period.

In some examples, to support obtaining the request to enable the scheduling restriction at the UE, the scheduling restriction component 1230 may be configured as or otherwise support a means for obtaining an indication of one or more transmission parameters that are requested to be used for any control or data channel transmissions scheduled during the time period if the directivity gain satisfies a second threshold directivity gain, where the one or more transmission parameters include a relatively higher aggregation level, a relatively lower rank, or a relatively lower coding rate, or any combination thereof, relative to an aggregation level, a rank, or a coding rate used for control or data channel transmissions based on a non-group-based reference signal measurement.

In some examples, to support obtaining the request to enable the scheduling restriction at the UE, the scheduling restriction component 1230 may be configured as or otherwise support a means for obtaining an indication of a requested restriction against scheduling any control or data channel transmissions during the time period if the directivity gain fails to satisfy a second threshold directivity gain.

In some examples, the request indicates that the first directional receive beam and the second directional receive beam are associated with different sub-arrays of a same antenna array of the UE. In some examples, the directivity gain failing to satisfy the threshold directivity gain is based on the first directional receive beam and the second directional receive beam being associated with the different sub-arrays of the same antenna array of the UE.

In some examples, to support obtaining the request to enable or disable the scheduling restriction at the UE, the scheduling restriction component 1230 may be configured as or otherwise support a means for obtaining a request to disable the scheduling restriction at the UE based on the directivity gain of one or both of the first directional receive beam and the second directional receive beam satisfying a threshold directivity gain, where the information associated with the scheduling restriction output from the network entity indicates an absence of the scheduling restriction for the time period.

In some examples, the scheduling component 1240 may be configured as or otherwise support a means for scheduling, for a first TRP, a first set of one or more control or data channel transmissions during a first time period that at least partially overlaps with the first channel measurement resource. In some examples, the scheduling component 1240 may be configured as or otherwise support a means for scheduling, for a second TRP, a second set of one or more control or data channel transmissions during a second time period that at least partially overlaps with the second channel measurement resource.

In some examples, the request indicates that the first directional receive beam and the second directional receive beam are associated with different antenna arrays of the UE. In some examples, the directivity gain satisfying the threshold directivity gain is based on the first directional receive beam and the second directional receive beam being associated with the different antenna arrays of the UE.

In some examples, the group-based reference signal measurement is associated with reference signal measurements from multiple TRPs. In some examples, each TRP is associated with a different channel measurement resource set.

Figure 13:
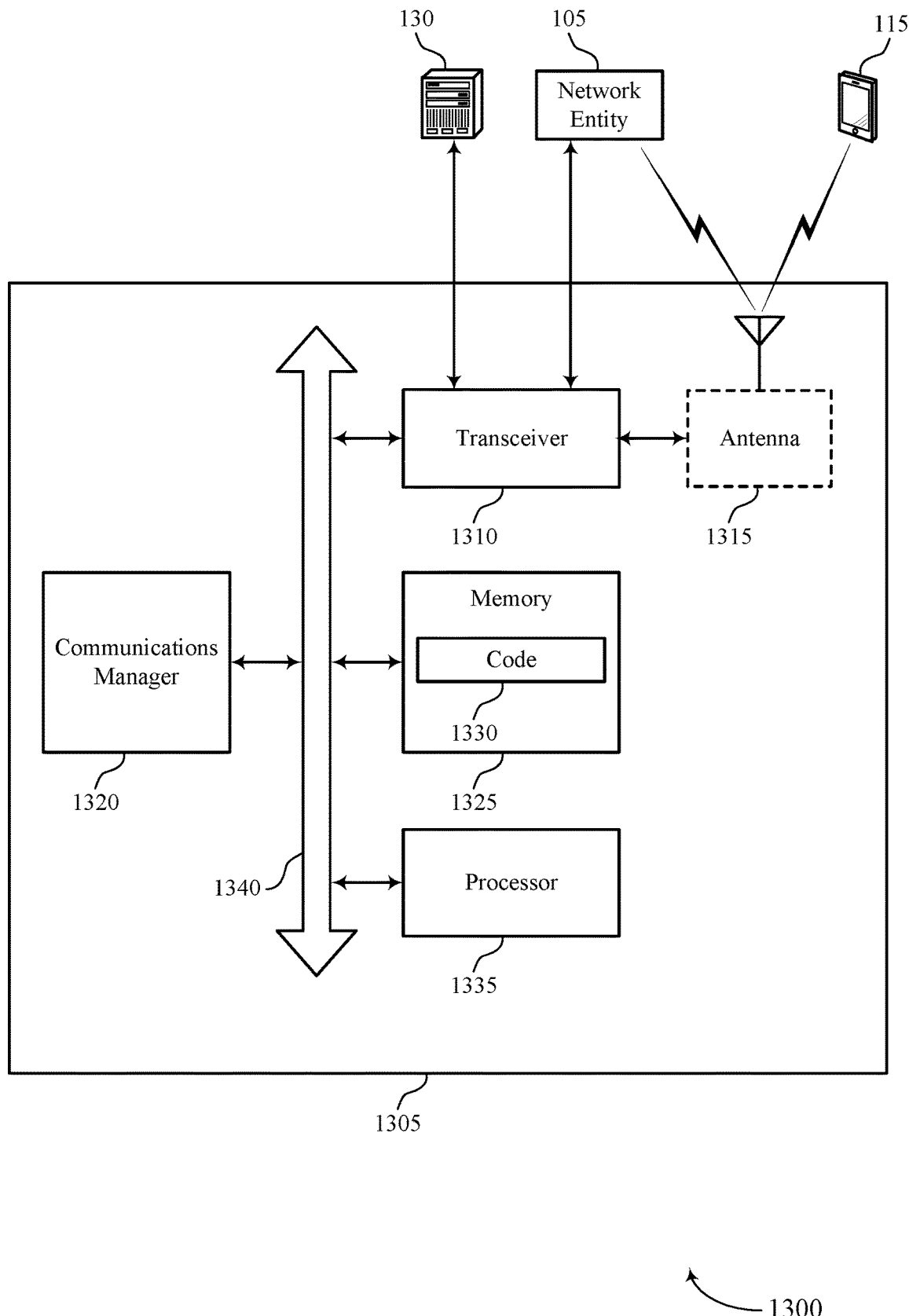
FIG. 13 shows a diagram of a system including a device that supports scheduling restrictions during a group-based measurement for multiple TRPs in accordance with one or more aspects of the present disclosure.

FIG. 13 shows a diagram of a system 1300 including a device 1305 that supports scheduling restrictions during a group-based measurement for multiple TRPs in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals.

In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting scheduling restrictions during a group-based measurement for multiple TRPs). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325).

In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for outputting an indication of multiple channel measurement resources for a group-based reference signal measurement. The communications manager 1320 may be configured as or otherwise support a means for obtaining, in accordance with the multiple channel measurement resources being for the group-based reference signal measurement, a request to enable or disable a scheduling restriction at a UE for a time period, the time period associated with one or more of the multiple channel measurement resources. The communications manager 1320 may be configured as or otherwise support a means for outputting information associated with the scheduling restriction at the UE in accordance with the request.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of scheduling restrictions during a group-based measurement for multiple TRPs as described herein, or the processor 1335 and the memory 1325 may be otherwise configured to perform or support such operations.

Figure 14:
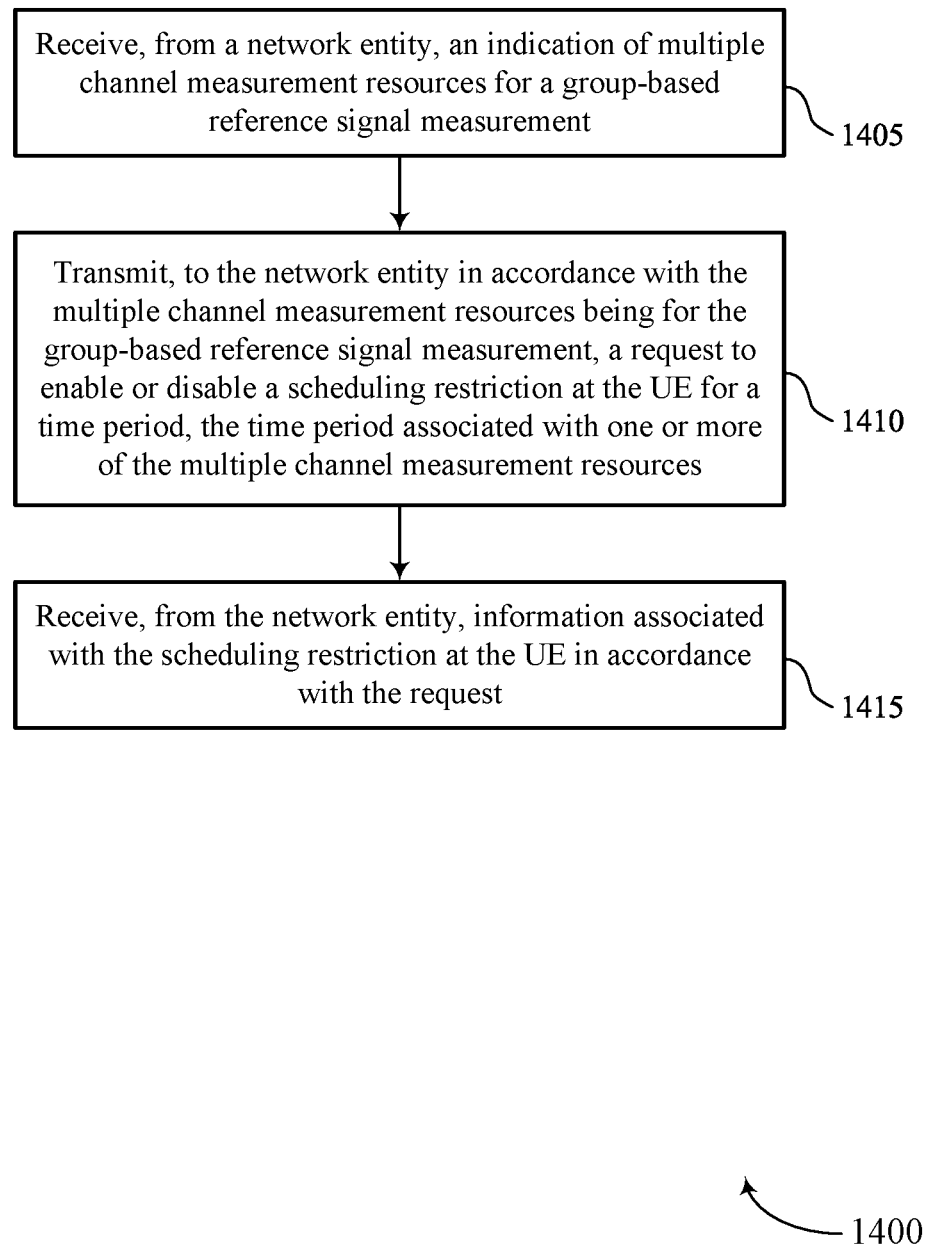
FIGS. 14 through 16 show flowcharts illustrating methods that support scheduling restrictions during a group-based measurement for multiple TRPs in accordance with one or more aspects of the present disclosure.

FIG. 14 shows a flowchart illustrating a method 1400 that supports scheduling restrictions during a group-based measurement for multiple TRPs in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, an indication of multiple channel measurement resources for a group-based reference signal measurement. The operations of 1405 may be performed in accordance with examples as disclosed herein. In some examples, aspects of the operations of 1405 may be performed by an CMR configuration component 825 as described with reference to FIG. 8.

At 1410, the method may include transmitting, to the network entity in accordance with the multiple channel measurement resources being for the group-based reference signal measurement, a request to enable or disable a scheduling restriction at the UE for a time period, the time period associated with one or more of the multiple channel measurement resources. The operations of 1410 may be performed in accordance with examples as disclosed herein. In some examples, aspects of the operations of 1410 may be performed by a scheduling restriction component 830 as described with reference to FIG. 8.

At 1415, the method may include receiving, from the network entity, information associated with the scheduling restriction at the UE in accordance with the request. The operations of 1415 may be performed in accordance with examples as disclosed herein. In some examples, aspects of the operations of 1415 may be performed by a scheduling restriction component 830 as described with reference to FIG. 8.

Figure 15:
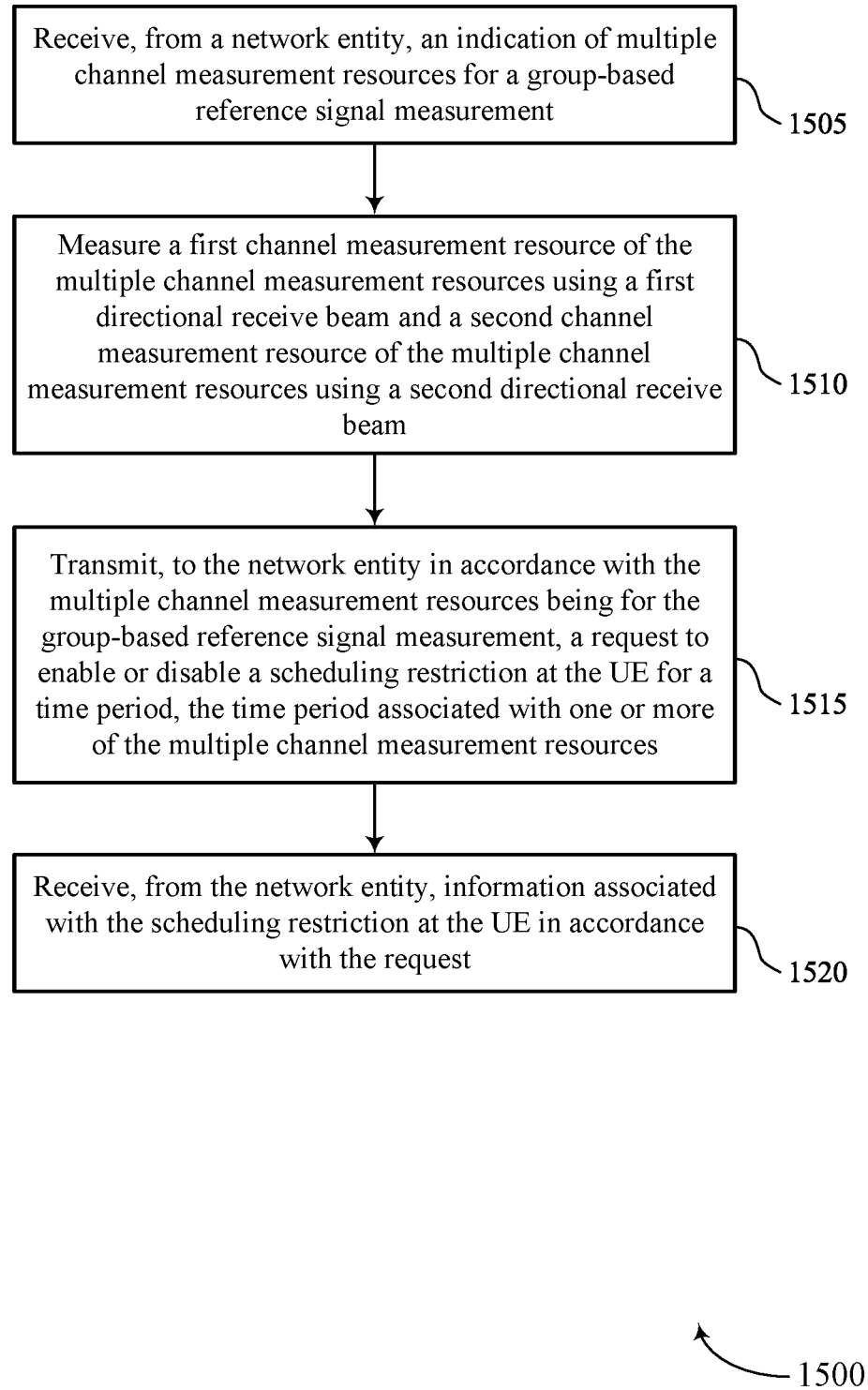

FIG. 15 shows a flowchart illustrating a method 1500 that supports scheduling restrictions during a group-based measurement for multiple TRPs in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, an indication of multiple channel measurement resources for a group-based reference signal measurement. The operations of 1505 may be performed in accordance with examples as disclosed herein. In some examples, aspects of the operations of 1505 may be performed by an CMR configuration component 825 as described with reference to FIG. 8.

At 1510, the method may include measuring a first channel measurement resource of the multiple channel measurement resources using a first directional receive beam and a second channel measurement resource of the multiple channel measurement resources using a second directional receive beam. The operations of 1510 may be performed in accordance with examples as disclosed herein. In some examples, aspects of the operations of 1510 may be performed by a channel measurement component 840 as described with reference to FIG. 8.

At 1515, the method may include transmitting, to the network entity in accordance with the multiple channel measurement resources being for the group-based reference signal measurement, a request to enable or disable a scheduling restriction at the UE for a time period, the time period associated with one or more of the multiple channel measurement resources. The operations of 1515 may be performed in accordance with examples as disclosed herein. In some examples, aspects of the operations of 1515 may be performed by a scheduling restriction component 830 as described with reference to FIG. 8.

At 1520, the method may include receiving, from the network entity, information associated with the scheduling restriction at the UE in accordance with the request. The operations of 1520 may be performed in accordance with examples as disclosed herein. In some examples, aspects of the operations of 1520 may be performed by a scheduling restriction component 830 as described with reference to FIG. 8.

Figure 16:
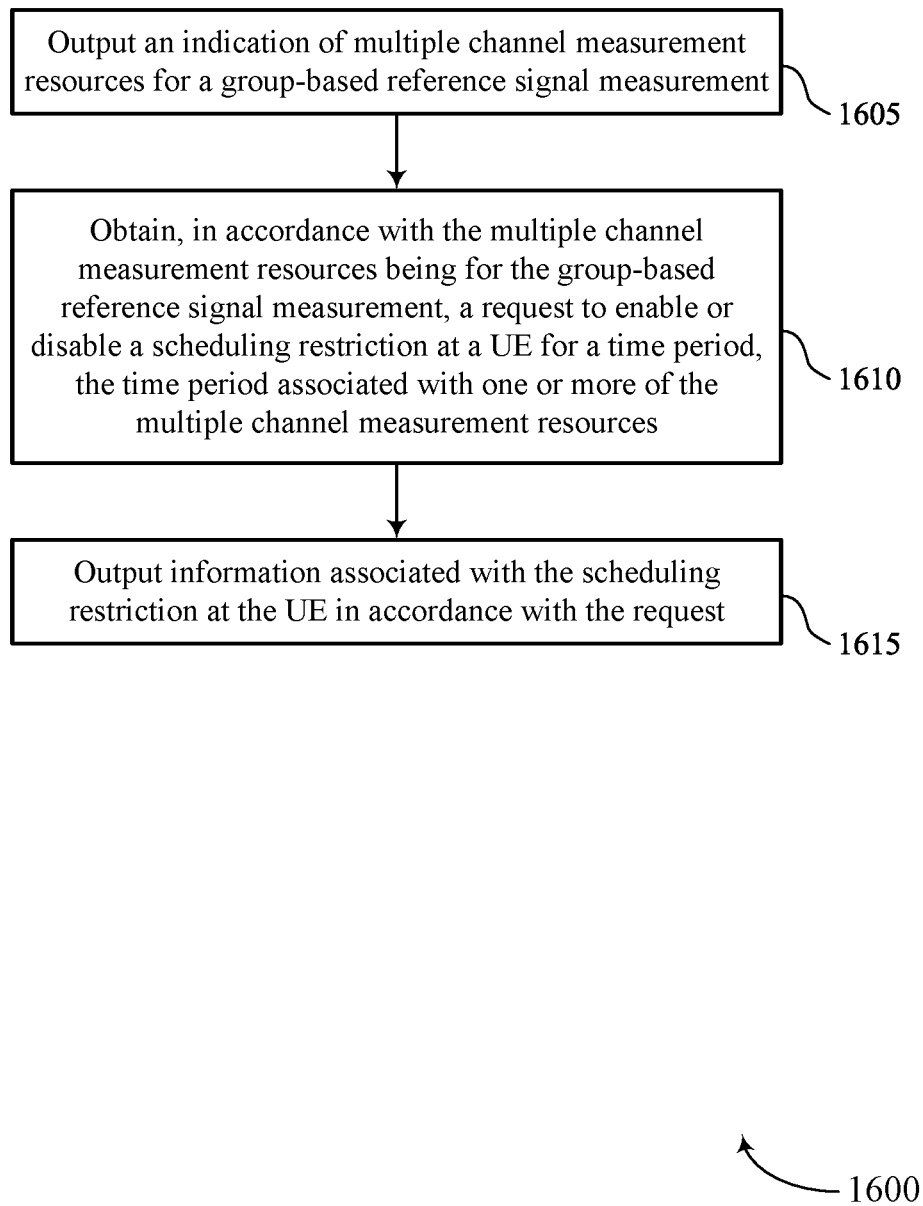

FIG. 16 shows a flowchart illustrating a method 1600 that supports scheduling restrictions during a group-based measurement for multiple TRPs in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include outputting an indication of multiple channel measurement resources for a group-based reference signal measurement. The operations of 1605 may be performed in accordance with examples as disclosed herein. In some examples, aspects of the operations of 1605 may be performed by an CMR configuration component 1225 as described with reference to FIG. 12.

At 1610, the method may include obtaining, in accordance with the multiple channel measurement resources being for the group-based reference signal measurement, a request to enable or disable a scheduling restriction at a UE for a time period, the time period associated with one or more of the multiple channel measurement resources. The operations of 1610 may be performed in accordance with examples as disclosed herein. In some examples, aspects of the operations of 1610 may be performed by a scheduling restriction component 1230 as described with reference to FIG. 12.

At 1615, the method may include outputting information associated with the scheduling restriction at the UE in accordance with the request. The operations of 1615 may be performed in accordance with examples as disclosed herein. In some examples, aspects of the operations of 1615 may be performed by a scheduling restriction component 1230 as described with reference to FIG. 12.

The following provides an overview of aspects of the present disclosure:

Aspect 1: A method for wireless communication at a UE, comprising: receiving, from a network entity, an indication of multiple channel measurement resources for a group-based reference signal measurement; transmitting, to the network entity in accordance with the multiple channel measurement resources being for the group-based reference signal measurement, a request to enable or disable a scheduling restriction at the UE for a time period, the time period associated with one or more of the multiple channel measurement resources; and receiving, from the network entity, information associated with the scheduling restriction at the UE in accordance with the request.

Aspect 2: The method of aspect 1, wherein transmitting the request to enable or disable the scheduling restriction at the UE comprises: transmitting an indication of whether the UE uses a different set of one or more directional receive beams for the group-based reference signal measurement than used for reception of one or more control or data channel transmissions, wherein a use of one or more different directional receive beams is associated with a request to enable the scheduling restriction and a use of one or more same directional beams is associated with a request to disable the scheduling restriction.

Aspect 3: The method of any of aspects 1 through 2, further comprising: measuring a first channel measurement resource of the multiple channel measurement resources using a first directional receive beam and a second channel measurement resource of the multiple channel measurement resources using a second directional receive beam, wherein the request to enable or disable the scheduling restriction at the UE is based at least in part on a directivity gain of one or both of the first directional receive beam and the second directional receive beam.

Aspect 4: The method of aspect 3, wherein transmitting the request to enable or disable the scheduling restriction at the UE comprises: transmitting a request to enable the scheduling restriction at the UE based at least in part on the directivity gain of one or both of the first directional receive beam and the second directional receive beam failing to satisfy a threshold directivity gain, wherein the information associated with the scheduling restriction received from the network entity indicates a presence of the scheduling restriction for the time period.

Aspect 5: The method of aspect 4, wherein transmitting the request to enable the scheduling restriction at the UE comprises: transmitting an indication of one or more transmission parameters that are requested to be used for any control or data channel transmissions scheduled during the time period if the directivity gain satisfies a second threshold directivity gain, wherein the one or more transmission parameters comprise a relatively higher aggregation level, a relatively lower rank, or a relatively lower coding rate, or any combination thereof, relative to an aggregation level, a rank, or a coding rate used for control or data channel transmissions based on a non-group-based reference signal measurement.

Aspect 6: The method of any of aspects 4 through 5, wherein transmitting the request to enable the scheduling restriction at the UE comprises: transmitting an indication of a requested restriction against scheduling any control or data channel transmissions during the time period if the directivity gain fails to satisfy a second threshold directivity gain.

Aspect 7: The method of any of aspects 4 through 6, wherein the first directional receive beam and the second directional receive beam are associated with different sub-arrays of a same antenna array of the UE, and the directivity gain failing to satisfy the threshold directivity gain is based at least in part on the first directional receive beam and the second directional receive beam being associated with the different sub-arrays of the same antenna array of the UE.

Aspect 8: The method of aspect 3, wherein transmitting the request to enable or disable the scheduling restriction at the UE comprises: transmitting a request to disable the scheduling restriction at the UE based at least in part on the directivity gain of one or both of the first directional receive beam and the second directional receive beam satisfying a threshold directivity gain, wherein the information associated with the scheduling restriction received from the network entity indicates an absence of the scheduling restriction for the time period.

Aspect 9: The method of aspect 8, further comprising: monitoring, using the second directional receive beam, for a first set of one or more control or data channel transmissions during a first time period that at least partially overlaps with the first channel measurement resource; and monitoring, using the first directional receive beam, for a second set of one or more control or data channel transmissions during a second time period that at least partially overlaps with the second channel measurement resource.

Aspect 10: The method of any of aspects 8 through 9, wherein the first directional receive beam and the second directional receive beam are associated with different antenna arrays of the UE, and the directivity gain satisfying the threshold directivity gain is based at least in part on the first directional receive beam and the second directional receive beam being associated with the different antenna arrays of the UE.

Aspect 11: The method of any of aspects 1 through 10, wherein the group-based reference signal measurement is associated with reference signal measurements from multiple TRPs, and each TRP is associated with a different channel measurement resource set.

Aspect 12: A method for wireless communication at a network entity, comprising: outputting an indication of multiple channel measurement resources for a group-based reference signal measurement; obtaining, in accordance with the multiple channel measurement resources being for the group-based reference signal measurement, a request to enable or disable a scheduling restriction at a UE for a time period, the time period associated with one or more of the multiple channel measurement resources; and outputting information associated with the scheduling restriction at the UE in accordance with the request.

Aspect 13: The method of aspect 12, wherein obtaining the request to enable or disable the scheduling restriction at the UE comprises: obtaining an indication of whether the UE uses a different set of one or more directional receive beams for the group-based reference signal measurement than used for reception of one or more control or data channel transmissions, wherein a use of one or more different directional receive beams is associated with a request to enable the scheduling restriction and a use of one or more same directional beams is associated with a request to disable the scheduling restriction.

Aspect 14: The method of any of aspects 12 through 13, wherein obtaining the request to enable or disable the scheduling restriction at the UE comprises: obtaining an indication of a first directional receive beam of the UE used to measure a first channel measurement resource of the multiple channel measurement resources and a second directional receive beam of the UE used to measure a second channel measurement resource of the multiple channel measurement resources, wherein the request to enable or disable the scheduling restriction at the UE is based at least in part on a directivity gain of one or both of the first directional receive beam and the second directional receive beam.

Aspect 15: The method of aspect 14, wherein obtaining the request to enable or disable the scheduling restriction at the UE comprises: obtaining a request to enable the scheduling restriction at the UE based at least in part on the directivity gain of one or both of the first directional receive beam and the second directional receive beam failing to satisfy a threshold directivity gain, wherein the information associated with the scheduling restriction output from the network entity indicates a presence of the scheduling restriction for the time period.

Aspect 16: The method of aspect 15, wherein obtaining the request to enable the scheduling restriction at the UE comprises: obtaining an indication of one or more transmission parameters that are requested to be used for any control or data channel transmissions scheduled during the time period if the directivity gain satisfies a second threshold directivity gain, wherein the one or more transmission parameters comprise a relatively higher aggregation level, a relatively lower rank, or a relatively lower coding rate, or any combination thereof, relative to an aggregation level, a rank, or a coding rate used for control or data channel transmissions based on a non-group-based reference signal measurement.

Aspect 17: The method of any of aspects 15 through 16, wherein obtaining the request to enable the scheduling restriction at the UE comprises: obtaining an indication of a requested restriction against scheduling any control or data channel transmissions during the time period if the directivity gain fails to satisfy a second threshold directivity gain.

Aspect 18: The method of any of aspects 15 through 17, wherein the request indicates that the first directional receive beam and the second directional receive beam are associated with different sub-arrays of a same antenna array of the UE, and the directivity gain failing to satisfy the threshold directivity gain is based at least in part on the first directional receive beam and the second directional receive beam being associated with the different sub-arrays of the same antenna array of the UE.

Aspect 19: The method of aspect 14, wherein obtaining the request to enable or disable the scheduling restriction at the UE comprises: obtaining a request to disable the scheduling restriction at the UE based at least in part on the directivity gain of one or both of the first directional receive beam and the second directional receive beam satisfying a threshold directivity gain, wherein the information associated with the scheduling restriction output from the network entity indicates an absence of the scheduling restriction for the time period.

Aspect 20: The method of aspect 19, further comprising: scheduling, for a first TRP, a first set of one or more control or data channel transmissions during a first time period that at least partially overlaps with the first channel measurement resource; and scheduling, for a second TRP, a second set of one or more control or data channel transmissions during a second time period that at least partially overlaps with the second channel measurement resource.

Aspect 21: The method of any of aspects 19 through 20, wherein the request indicates that the first directional receive beam and the second directional receive beam are associated with different antenna arrays of the UE, and the directivity gain satisfying the threshold directivity gain is based at least in part on the first directional receive beam and the second directional receive beam being associated with the different antenna arrays of the UE.

Aspect 22: The method of any of aspects 12 through 21, wherein the group-based reference signal measurement is associated with reference signal measurements from multiple TRPs, and each TRP is associated with a different channel measurement resource set.

Aspect 23: An apparatus for wireless communication at a UE, comprising a processor; memory coupled with the processor; and one or more instructions stored in the memory and executable by the processor to cause the apparatus to, based at least in part on the one or more instructions, perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a network entity, comprising a processor; memory coupled with the processor; and one or more instructions stored in the memory and executable by the processor to cause the apparatus to, based at least in part on the one or more instructions, perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Further, "a set" may refer to a set of one or a set of multiple.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor;
   at least one memory coupled with the at least one processor; and
   one or more instructions stored in the at least one memory and executable by the at least one processor to cause the apparatus to, based at least in part on the one or more instructions:
   receive, from a network entity, an indication of multiple channel measurement resources for a group-based reference signal measurement;
   transmit, to the network entity based at least in part on the multiple channel measurement resources being for the group-based reference signal measurement and based at least in part on a first set of one or more directional receive beams used for the group-based reference signal measurement, a request to enable or disable a scheduling restriction at the UE for a time period, the time period associated with one or more of the multiple channel measurement resources; and receive, from the network entity, information associated with the scheduling restriction at the UE in accordance with the request.

2. The apparatus of claim 1, wherein the one or more instructions to transmit the request to enable or disable the scheduling restriction at the UE are executable by the at least one processor to cause the apparatus to, based at least in part on the one or more instructions:

transmit an indication of whether the first set of one or more directional receive beams for the group-based reference signal measurement is different than a second set of one or more directional receive beams used for reception of one or more control or data channel transmissions or whether the first set of one or more directional receive beams for the group-based reference signal measurement is the same as the second set of one or more directional receive beams, wherein the first set of one or more directional receive beams being different than the second set of one or more directional receive beams is associated with a request to enable the scheduling restriction and the first set of one or more directional receive beams being the same as the second set of one or more directional receive beams is associated with a request to disable the scheduling restriction.

3. The apparatus of claim 1, wherein the one or more instructions are further executable by the at least one processor to cause the apparatus to, based at least in part on the one or more instructions:

measure a first channel measurement resource of the multiple channel measurement resources using a first directional receive beam and a second channel measurement resource of the multiple channel measurement resources using a second directional receive beam, wherein the request to enable or disable the scheduling restriction at the UE is based at least in part on a directivity gain of one or both of the first directional receive beam and the second directional receive beam.

4. The apparatus of claim 3, wherein the one or more instructions to transmit the request to enable or disable the scheduling restriction at the UE are executable by the at least one processor to cause the apparatus to, based at least in part on the one or more instructions:

transmit a request to enable the scheduling restriction at the UE based at least in part on the directivity gain of one or both of the first directional receive beam and the second directional receive beam failing to satisfy a threshold directivity gain, wherein the information associated with the scheduling restriction received from the network entity indicates a presence of the scheduling restriction for the time period.

5. The apparatus of claim 4, wherein the one or more instructions to transmit the request to enable the scheduling restriction at the UE are executable by the at least one processor to cause the apparatus to, based at least in part on the one or more instructions:

transmit an indication of one or more transmission parameters that are requested to be used for any control or data channel transmissions scheduled during the time period if the directivity gain of one or both of the first directional receive beam and the second directional receive beam satisfies a second threshold directivity gain, wherein the one or more transmission parameters comprise at least one of a relatively higher aggregation level, a relatively lower rank, or a relatively lower coding rate relative to an aggregation level, a rank, or a coding rate, respectively, used for control or data channel transmissions based on a non-group-based reference signal measurement.

6. The apparatus of claim 4, wherein the one or more instructions to transmit the request to enable the scheduling restriction at the UE are executable by the at least one processor to cause the apparatus to, based at least in part on the one or more instructions:

transmit an indication of a requested restriction against scheduling any control or data channel transmissions during the time period if the directivity gain of one or both of the first directional receive beam and the second directional receive beam fails to satisfy a second threshold directivity gain.

7. The apparatus of claim 4, wherein the first directional receive beam and the second directional receive beam are associated with different sub-arrays of a same antenna array of the UE, and wherein the directivity gain failing to satisfy the threshold directivity gain is based at least in part on the first directional receive beam and the second directional receive beam being associated with the different sub-arrays of the same antenna array of the UE.

8. The apparatus of claim 3, wherein the one or more instructions to transmit the request to enable or disable the scheduling restriction at the UE are executable by the at least one processor to cause the apparatus to, based at least in part on the one or more instructions:

transmit a request to disable the scheduling restriction at the UE based at least in part on the directivity gain of one or both of the first directional receive beam and the second directional receive beam satisfying a threshold directivity gain, wherein the information associated with the scheduling restriction received from the network entity indicates an absence of the scheduling restriction for the time period.

9. The apparatus of claim 8, wherein the one or more instructions are further executable by the at least one processor to cause the apparatus to, based at least in part on the one or more instructions:

monitor, using the second directional receive beam, for a first set of one or more control or data channel transmissions during a first time period that at least partially overlaps with the first channel measurement resource; and monitor, using the first directional receive beam, for a second set of one or more control or data channel transmissions during a second time period that at least partially overlaps with the second channel measurement resource.

10. The apparatus of claim 8, wherein the first directional receive beam and the second directional receive beam are associated with different antenna arrays of the UE, and wherein the directivity gain of one or both of the first directional receive beam and the second directional receive beam satisfying the threshold directivity gain is based at least in part on the first directional receive beam and the second directional receive beam being associated with the different antenna arrays of the UE.

11. The apparatus of claim 1, wherein the group-based reference signal measurement is associated with reference signal measurements from multiple transmission and reception points (TRPs), and wherein each TRP is associated with a different channel measurement resource set.

12. An apparatus for wireless communication at a network entity, comprising:
at least one processor;

at least one memory coupled with the at least one processor; and
one or more instructions stored in the at least one memory and executable by the at least one processor to cause the apparatus to, based at least in part on the one or more instructions:
output an indication of multiple channel measurement resources for a group-based reference signal measurement;
obtain, based at least in part on the multiple channel measurement resources being for the group-based reference signal measurement and based at least in part on a first set of one or more directional receive beams used for the group-based reference signal measurement, a request to enable or disable a scheduling restriction at a user equipment (UE) for a time period, the time period associated with one or more of the multiple channel measurement resources; and
output information associated with the scheduling restriction at the UE in accordance with the request.

13. The apparatus of claim 12, wherein the one or more instructions to obtain the request to enable or disable the scheduling restriction at the UE are executable by the at least one processor to cause the apparatus to, based at least in part on the one or more instructions:
obtain an indication of whether the first set of one or more directional receive beams for the group-based reference signal measurement is different than a second set of one or more directional receive beams used for reception of one or more control or data channel transmissions or whether the first set of one or more directional receive beams for the group-based reference signal measurement is the same as the second set of one or more directional receive beams, wherein the first set of one or more directional receive beams being different than the second set of one or more directional receive beams is associated with a request to enable the scheduling restriction and the first set of one or more directional receive beams being the same as the second set of one or more directional receive beams is associated with a request to disable the scheduling restriction.

14. The apparatus of claim 12, wherein the one or more instructions to obtain the request to enable or disable the scheduling restriction at the UE are executable by the at least one processor to cause the apparatus to, based at least in part on the one or more instructions:
obtain an indication of a first directional receive beam of the UE used to measure a first channel measurement resource of the multiple channel measurement resources and a second directional receive beam of the UE used to measure a second channel measurement resource of the multiple channel measurement resources, wherein the request to enable or disable the scheduling restriction at the UE is based at least in part on a directivity gain of one or both of the first directional receive beam and the second directional receive beam.

15. The apparatus of claim 14, wherein the one or more instructions to obtain the request to enable or disable the scheduling restriction at the UE are executable by the at least one processor to cause the apparatus to, based at least in part on the one or more instructions:
obtain a request to enable the scheduling restriction at the UE based at least in part on the directivity gain of one or both of the first directional receive beam and the second directional receive beam failing to satisfy a threshold directivity gain, wherein the information associated with the scheduling restriction output from the network entity indicates a presence of the scheduling restriction for the time period.

16. The apparatus of claim 15, wherein the one or more instructions to obtain the request to enable the scheduling restriction at the UE are executable by the at least one processor to cause the apparatus to, based at least in part on the one or more instructions:
obtain an indication of one or more transmission parameters that are requested to be used for any control or data channel transmissions scheduled during the time period if the directivity gain of one or both of the first directional receive beam and the second directional receive beam satisfies a second threshold directivity gain, wherein the one or more transmission parameters comprise at least one of a relatively higher aggregation level, a relatively lower rank, or a relatively lower coding rate relative to an aggregation level, a rank, or a coding rate, respectively, used for control or data channel transmissions based on a non-group-based reference signal measurement.

17. The apparatus of claim 15, wherein the one or more instructions to obtain the request to enable the scheduling restriction at the UE are executable by the at least one processor to cause the apparatus to, based at least in part on the one or more instructions:
obtain an indication of a requested restriction against scheduling any control or data channel transmissions during the time period if the directivity gain of one or both of the first directional receive beam and the second directional receive beam fails to satisfy a second threshold directivity gain.

18. The apparatus of claim 14, wherein the one or more instructions to obtain the request to enable or disable the scheduling restriction at the UE are executable by the at least one processor to cause the apparatus to, based at least in part on the one or more instructions:
obtain a request to disable the scheduling restriction at the UE based at least in part on the directivity gain of one or both of the first directional receive beam and the second directional receive beam satisfying a threshold directivity gain, wherein the information associated with the scheduling restriction output from the network entity indicates an absence of the scheduling restriction for the time period.

19. The apparatus of claim 18, wherein the one or more instructions are further executable by the at least one processor to cause the apparatus to, based at least in part on the one or more instructions:
schedule, for a first transmission and reception point (TRP), a first set of one or more control or data channel transmissions during a first time period that at least partially overlap with the first channel measurement resource; and
schedule, for a second TRP, a second set of one or more control or data channel transmissions during a second time period that at least partially overlap with the second channel measurement resource.

20. A method for wireless communication at a user equipment (UE), comprising:
receiving, from a network entity, an indication of multiple channel measurement resources for a group-based reference signal measurement;
transmitting, to the network entity based at least in part on the multiple channel measurement resources being for the group-based reference signal measurement and based at least in part on a first set of one or more directional receive beams used for the group-based reference signal measurement, a request to enable or disable a scheduling restriction at the UE for a time period, the time period associated with one or more of the multiple channel measurement resources; and receiving, from the network entity, information associated with the scheduling restriction at the UE in accordance with the request.

21. The method of claim 20, wherein transmitting the request to enable or disable the scheduling restriction at the UE comprises:

transmitting an indication of whether the first set of one or more directional receive beams for the group-based reference signal measurement is different than a second set of one or more directional receive beams used for reception of one or more control or data channel transmissions or whether the first set of one or more directional receive beams for the group-based reference signal measurement is the same as the second set of one or more directional receive beams, wherein the first set of one or more directional receive beams being different than the second set of one or more directional receive beams is associated with a request to enable the scheduling restriction and the first set of one or more directional receive beams being the same as the second set of one or more directional receive beams is associated with a request to disable the scheduling restriction.

22. The method of claim 20, further comprising:

measuring a first channel measurement resource of the multiple channel measurement resources using a first directional receive beam and a second channel measurement resource of the multiple channel measurement resources using a second directional receive beam, wherein the request to enable or disable the scheduling restriction at the UE is based at least in part on a directivity gain of one or both of the first directional receive beam and the second directional receive beam.

23. The method of claim 22, wherein transmitting the request to enable or disable the scheduling restriction at the UE comprises:

transmitting a request to enable the scheduling restriction at the UE based at least in part on the directivity gain of one or both of the first directional receive beam and the second directional receive beam failing to satisfy a threshold directivity gain, wherein the information associated with the scheduling restriction received from the network entity indicates a presence of the scheduling restriction for the time period.

24. The method of claim 23, wherein transmitting the request to enable the scheduling restriction at the UE comprises:

transmitting an indication of a requested restriction against scheduling any control or data channel transmissions during the time period if the directivity gain of one or both of the first directional receive beam and the second directional receive beam fails to satisfy a second threshold directivity gain.

25. The method of claim 22, wherein transmitting the request to enable or disable the scheduling restriction at the UE comprises:

transmitting a request to disable the scheduling restriction at the UE based at least in part on the directivity gain of one or both of the first directional receive beam and the second directional receive beam satisfying a threshold directivity gain, wherein the information associated with the scheduling restriction received from the network entity indicates an absence of the scheduling restriction for the time period.

26. A method for wireless communication at a network entity, comprising:

outputting an indication of multiple channel measurement resources for a group-based reference signal measurement;

obtaining, based at least in part on the multiple channel measurement resources being for the group-based reference signal measurement and based at least in part on a first set of one or more directional receive beams used for the group-based reference signal measurement, a request to enable or disable a scheduling restriction at a user equipment (UE) for a time period, the time period associated with one or more of the multiple channel measurement resources; and outputting information associated with the scheduling restriction at the UE in accordance with the request.

27. The method of claim 26, wherein obtaining the request to enable or disable the scheduling restriction at the UE comprises:

obtaining an indication of whether the first set of one or more directional receive beams for the group-based reference signal measurement is different than a second set of one or more directional receive beams used for reception of one or more control or data channel transmissions or whether the first set of one or more directional receive beams for the group-based reference signal measurement is the same as the second set of one or more directional receive beams, wherein the first set of one or more directional receive beams being different than the second set of one or more directional receive beams is associated with a request to enable the scheduling restriction and the first set of one or more directional receive beams being the same as the second set of one or more directional receive beams is associated with a request to disable the scheduling restriction.

28. The method of claim 26, wherein obtaining the request to enable or disable the scheduling restriction at the UE comprises:

obtaining an indication of a first directional receive beam of the UE used to measure a first channel measurement resource of the multiple channel measurement resources and a second directional receive beam of the UE used to measure a second channel measurement resource of the multiple channel measurement resources, wherein the request to enable or disable the scheduling restriction at the UE is based at least in part on a directivity gain of one or both of the first directional receive beam and the second directional receive beam.

29. The method of claim 28, wherein obtaining the request to enable or disable the scheduling restriction at the UE comprises:

obtaining a request to enable the scheduling restriction at the UE based at least in part on the directivity gain of one or both of the first directional receive beam and the second directional receive beam failing to satisfy a threshold directivity gain, wherein the information associated with the scheduling restriction output from the network entity indicates a presence of the scheduling restriction for the time period.

30. The method of claim 28, wherein obtaining the request to enable or disable the scheduling restriction at the UE comprises:

obtaining a request to disable the scheduling restriction at the UE based at least in part on the directivity gain of one or both of the first directional receive beam and the second directional receive beam satisfying a threshold directivity gain, wherein the information associated with the scheduling restriction output from the network entity indicates an absence of the scheduling restriction for the time period.

* * * * *